Figure 1:
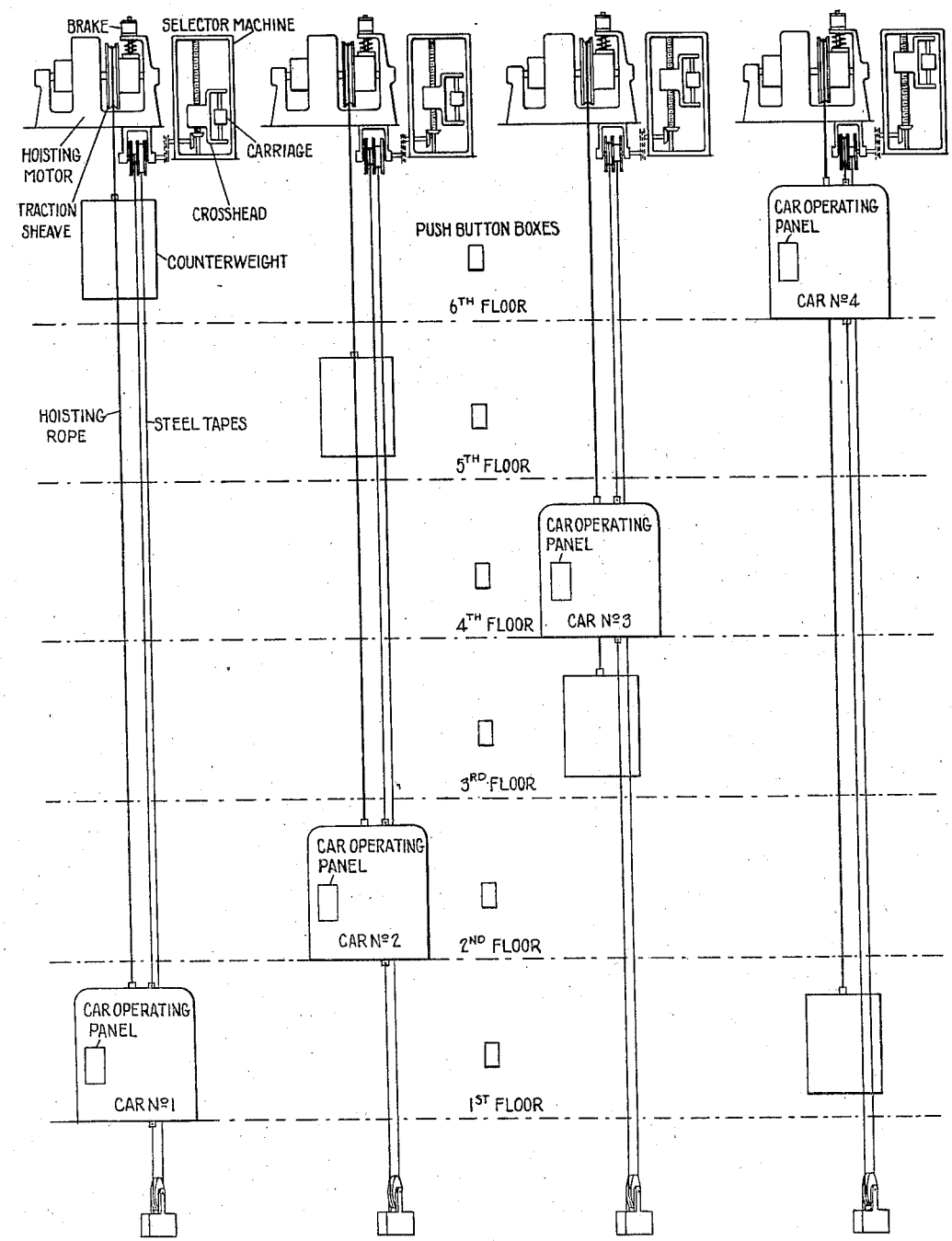

May 26, 1942. G. WATSON 2,284,113
DISPATCHING AND CONTROL SYSTEM FOR ELEVATORS
Filed July 30, 1940 9 Sheets-Sheet 1

Gavin Watson INVENTOR
BY *Walter F. W. Bradley* ATTORNEY

May 26, 1942. G. WATSON 2,284,113
DISPATCHING AND CONTROL SYSTEM FOR ELEVATORS
Filed July 30, 1940 9 Sheets-Sheet 2

Gavin Watson INVENTOR

BY *Walter F. Bradley* ATTORNEY

May 26, 1942.  G. WATSON  2,284,113
DISPATCHING AND CONTROL SYSTEM FOR ELEVATORS
Filed July 30, 1940   9 Sheets-Sheet 3
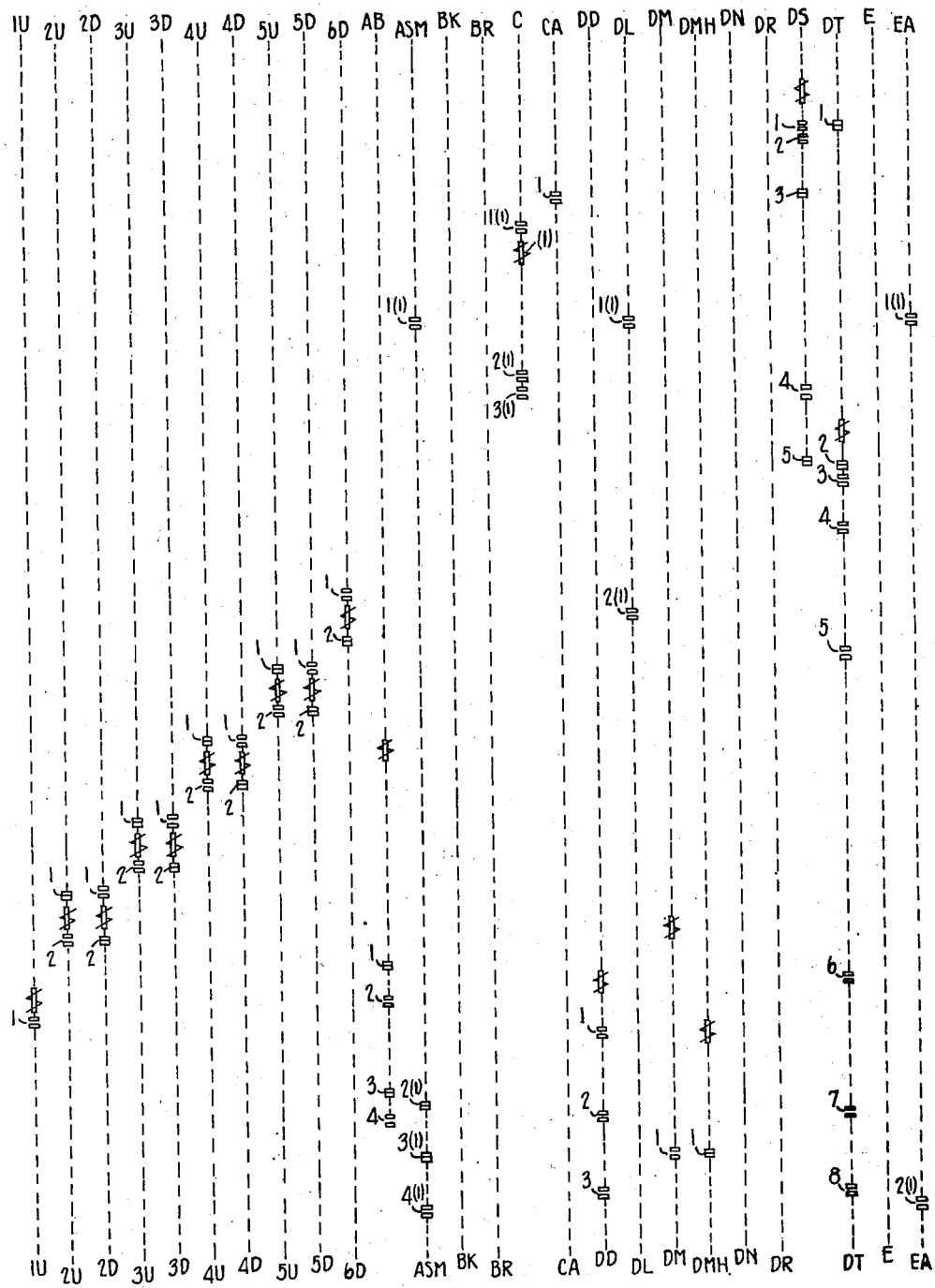
FIG.(2-4)a   Gavin Watson   INVENTOR
BY   ATTORNEY May 26, 1942.   G. WATSON   2,284,113
DISPATCHING AND CONTROL SYSTEM FOR ELEVATORS
Filed July 30, 1940   9 Sheets-Sheet 4
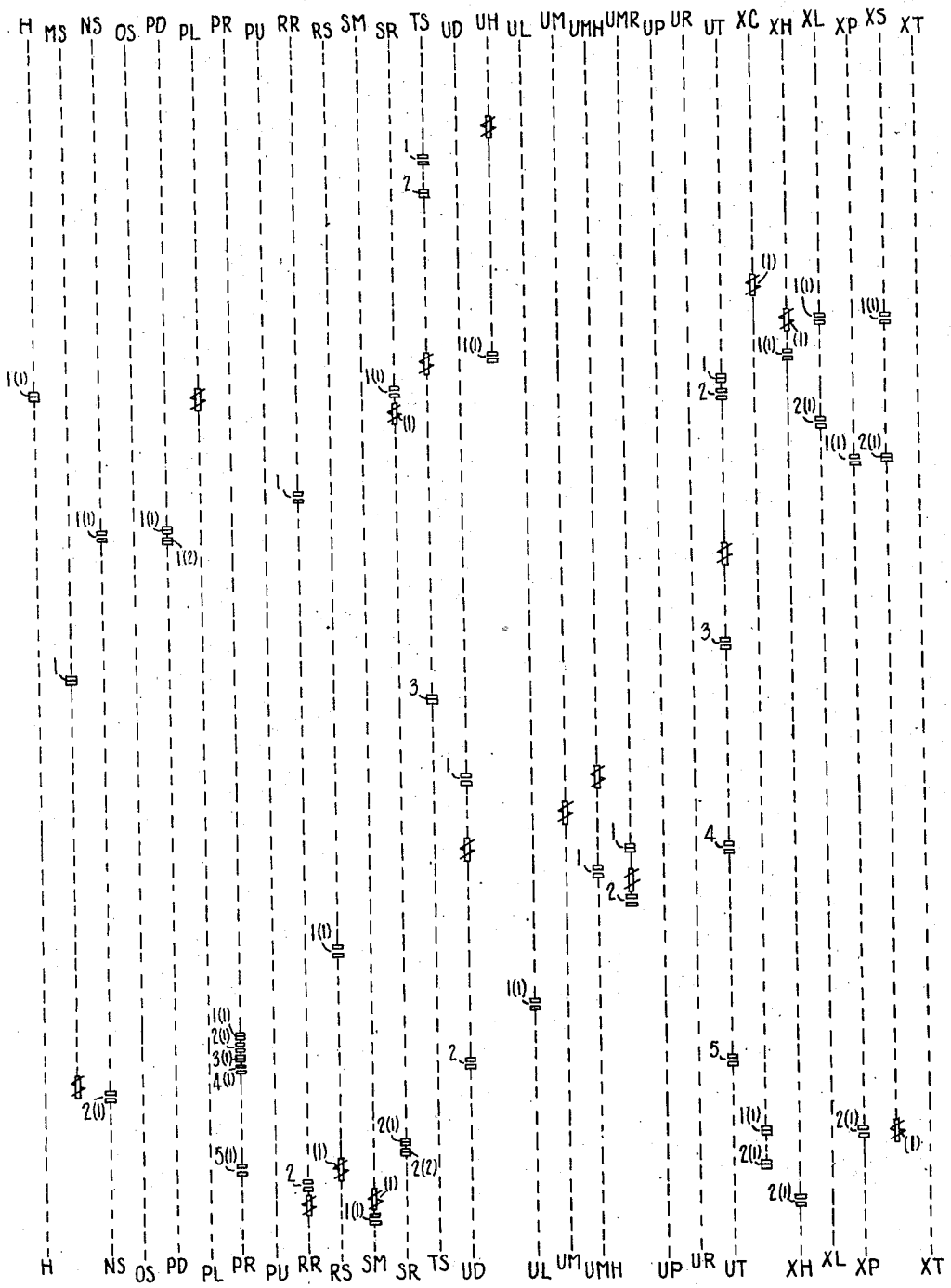
FIG.(2-4)b   Gavin Watson   INVENTOR
BY   ATTORNEY May 26, 1942.　　　　G. WATSON.　　　　2,284,113
DISPATCHING AND CONTROL SYSTEM FOR ELEVATORS
Filed July 30, 1940　　　9 Sheets-Sheet 5
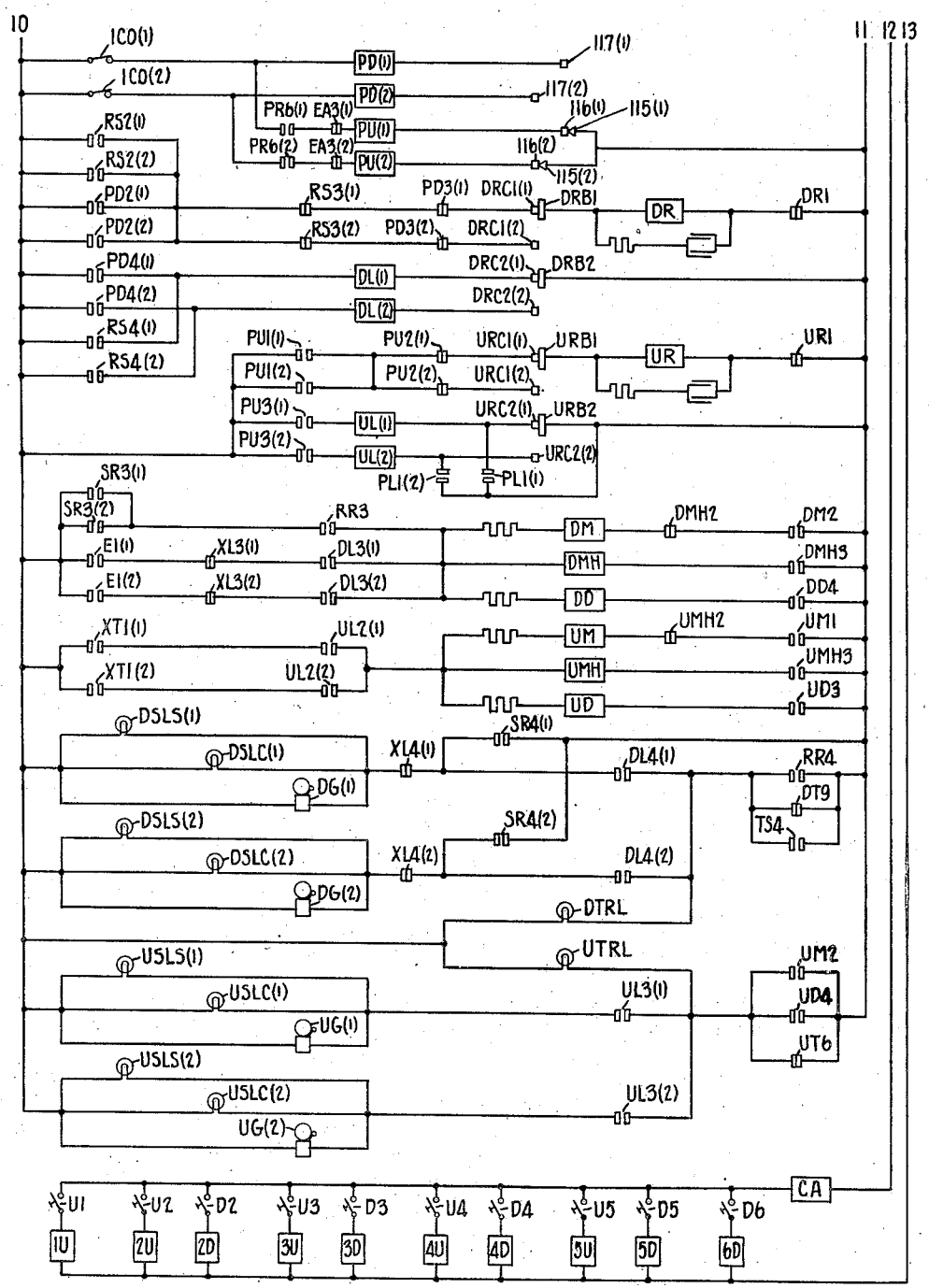
FIG. 3　　Gavin Watson　INVENTOR
BY　Matthew F. Bradley　ATTORNEY

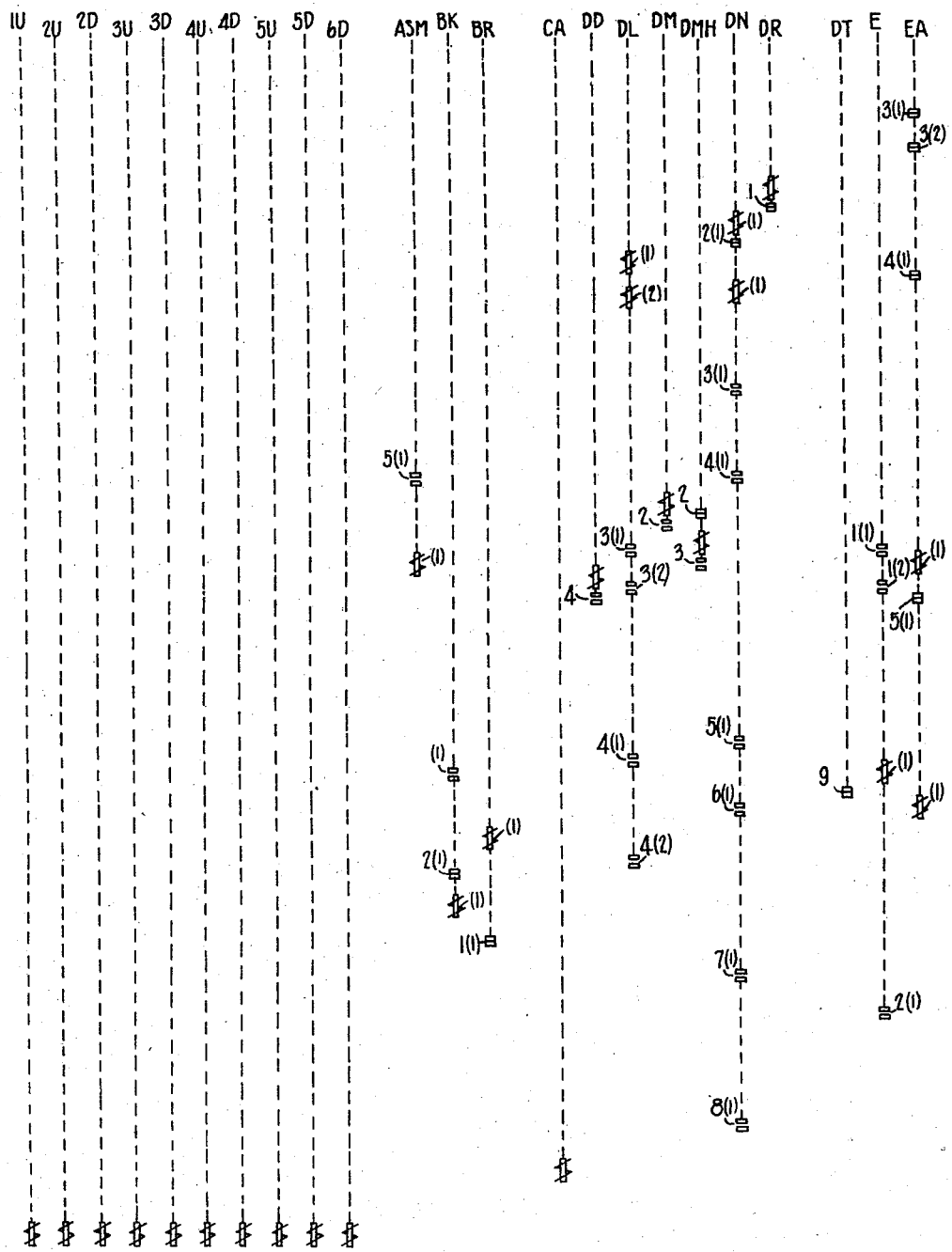
FIG.(3-5)a

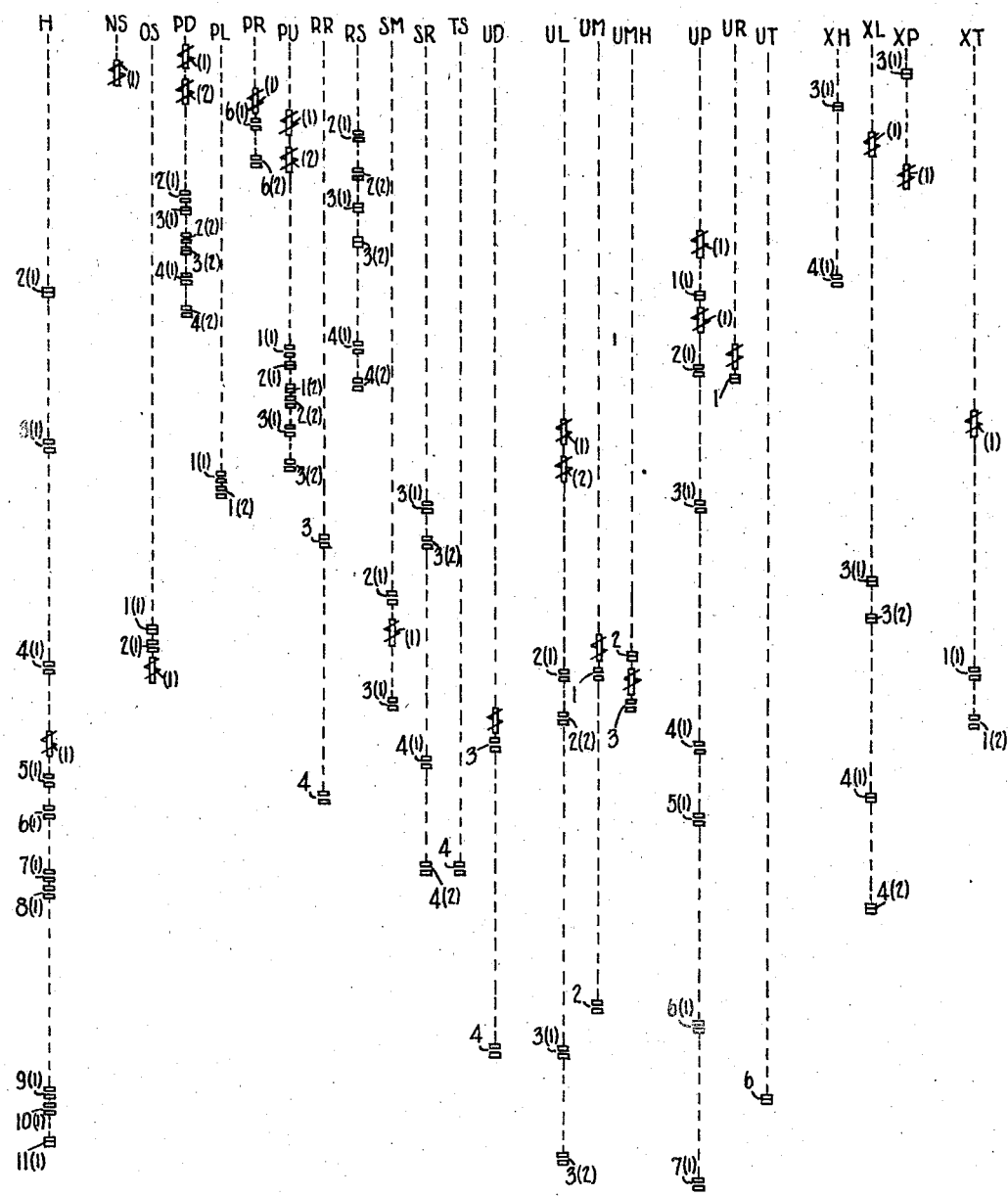
FIG(3-5)b

May 26, 1942.   G. WATSON   2,284,113
DISPATCHING AND CONTROL SYSTEM FOR ELEVATORS
Filed July 30, 1940   9 Sheets-Sheet 9

Gavin Watson   INVENTOR

BY   Matthew C. Bradley   ATTORNEY

Patented May 26, 1942

2,284,113

UNITED STATES PATENT OFFICE 2,284,113

DISPATCHING AND CONTROL SYSTEM FOR ELEVATORS

Gavin Watson, Ossining, N. Y., assignor to Otis Elevator Company, New York, N. Y., a corporation of New Jersey Application July 30, 1940, Serial No. 348,402

23 Claims. (Cl. 187—29)

The invention relates to dispatching and control systems for elevator cars.

In certain types of elevator installations in which the floors of the building are served by elevator cars arranged in a group and in which service of high quality is desired, dispatching and scheduling mechanism is provided to give starting signals to the elevator cars for starting them on their trips. Various forms of dispatching and scheduling systems have already been proposed for controlling the giving of these signals. In such systems, the starting signals are given the cars at one or both terminal floors. In certain of these systems in which starting signals are given at both terminals, the mechanism is arranged to give these signals at regular intervals, under conditions where there is considerable traffic both in the up and the down direction, so as to keep the cars in balanced relationship. When traffic is predominantly up, timed starting signals are given the cars at the lower terminal and starting signals given immediately to cars arriving at the upper terminal, except when a car is already at the terminal, and then as soon as such car leaves. Similarly, when traffic is predominantly down, timed starting signals are given the cars at the upper terminal and starting signals are given immediately to cars arriving at the lower terminal, except when a car is already at the terminal, and then as soon as such car leaves. When a car is delayed in arriving at a terminal, the timed signal is retained so as to be given the car immediately upon its arrival. However, should occasion arise that a car does not leave the terminal until the expiration after the regular time for giving the signal of a certain portion of the time interval, the timing mechanism is stopped or detented until the car leaves. Also in such systems an advisory signal is given in the car when it has been selected to leave and the hall lantern for that car is lighted. This advises the car attendant and intending passengers that that car is to be the next to leave.

The invention is especially applicable to installations in which the cars are stopped at the floors in response to calls registered by push buttons at such floors or in the cars for such floors, with the starting of the cars under the control of attendants in the respective cars.

Certain features of the invention are directed to the giving of signals to the cars to start their downward trips. In carrying out the invention as applied to conditions where there is traffic both in the up and down directions and preferably also to conditions where traffic is predominantly down, if a car reaches the upper terminal before the time arrives for the giving of the starting signal, the starting signal is given this car. However, if no car has reached the upper terminal when this time arrives, the starting signal may be given to a car without having it travel to the upper terminal floor. It is preferred to give such signal only to a car which has arrived in a certain zone below the upper terminal. According to the preferred arrangement if, as the time arrives to give a signal to start a car down, no car is at the upper terminal, this signal is given a car in the selection zone which reaches its highest call, that is, highest car call or down hall call with no up hall call registered for the corresponding floor and no call registered for a floor above. Such a car is caused to stop at the floor for which such highest call is registered and become set for travel in the down direction. If a car has no call above under conditions where no car is at the upper terminal as the time arrives to give the starting signal, the signal is given this car, it being brought to a stop at the first floor in the selection zone at which a stop can be made and its direction of travel set for down.

Should no car be available to receive the signal to start down within a predetermined period after the time arrives to give this signal, or should a car receive the starting signal at the upper terminal and not leave before the expiration of this period, a detent operation takes place. This detent is released as soon as a car becomes available in the selection zone to receive the signal in case no car has received the signal at the upper terminal and if a car has received the signal at the upper terminal, as soon as the car leaves on its downward trip.

Under conditions where traffic is in both the up and down direction, starting signals are given to start the cars on their upward trip at regular intervals and a detent operation takes place only in the event the car does not leave within a certain period after the time arrives for giving the starting signal. Another feature of the invention applies to the condition where traffic is predominantly down, and involves giving the starting signal to each car immediately upon its arrival at the lower terminal under such traffic conditions, regardless of whether any other car is at the lower terminal or not.

Another feature of the invention is applicable to conditions where traffic is predominantly in the up direction. Under such conditions, the starting signals are given the cars at the lower terminal at regular intervals. However, as soon as a car reaches its highest call, that is, its highest car or down hall call under conditions where no up hall call is registered for the corresponding floor or a floor above, the car is brought to a stop at such floor and is set for travel in the down direction. The signal to start down is given incident to this operation so that the car may immediately start on its downward trip.

Still another feature involves the giving of manual starting signals to the cars. Should a manual signal be given a car at a terminal floor and the regular time signal come on before the car leaves, the manual starting signal is automatically retained for the next car. Should a manual signal to start down be given under up and down traffic conditions or predominantly down traffic conditions when no car is at the upper terminal, this signal is given a car below the upper terminal as soon as it reaches its highest call in the selection zone or, if it has no call above, at the first floor in the selection zone at which a stop can be made, the car being brought to a stop at such floor and set for travel in the down direction. Should the regular time interval come on before a car reaches a floor below the upper terminal at which it would receive the manual start signal, this manual start signal is automatically retained so as to be given to the next available car.

Other features and advantages will be seen from the following description and appended claims.

In the drawings—

Figure 1 is a schematic diagram of a four-car elevator installation illustrating relative positions of the cars;

Figures 2, 3, 4 and 5 taken together constitute a simplified wiring diagram of dispatching circuits for a plurality of elevators and control circuits for one of them; and Figures (2–4)$a$, (2–4)$b$, (3–5)$a$ and (3–5)$b$ are key sheets for Figures 2, 3, 4 and 5, showing the electromagnetic switches in spindle form with the contacts and coils on the spindles in horizontal alignment with the contacts and coils on the wiring diagram.

For a general understanding of the invention reference may be had to Figure 1, wherein various parts of the system chosen to illustrate the principles of the invention are indicated by legend. Four elevators are illustrated, with the cars at different floors in the hatchway. The arrangement is the same for each elevator. Each car is raised and lowered by means of a hoisting motor, which motor drives a traction sheave over which pass hoisting ropes for the car and counterweight. An electromagnetic brake is provided and is applied to effect the final stopping operation and to hold the car when at rest.

Each elevator car is provided with a car operating panel on which are located a plurality of control switches for operation by the car attendant. These switches include a start control switch, a plurality of push buttons, one for each floor above the lower terminal, hereinafter termed car buttons, reversing buttons, a buzzer switch, a safety switch and a non-stop button. These switches are shown in the wiring diagrams of Figures 4 and 5.

At each floor is a push button box within which are arranged push buttons, an up and a down push button at each intermediate floor and one push button at each terminal floor. These push buttons, which will hereinafter be termed hall buttons, are common to the cars and are shown in Figure 3.

Figure 2:
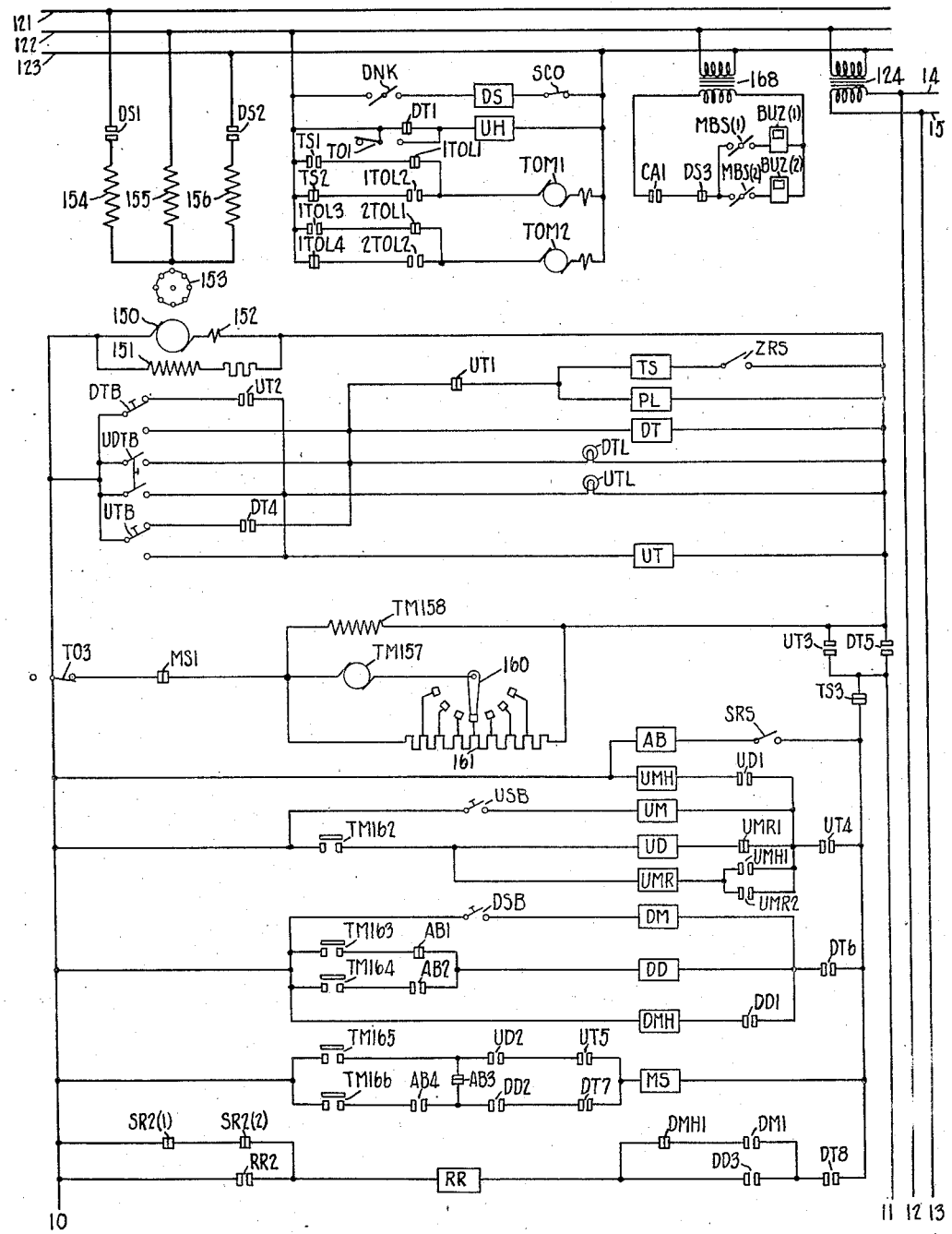
Figure 4:
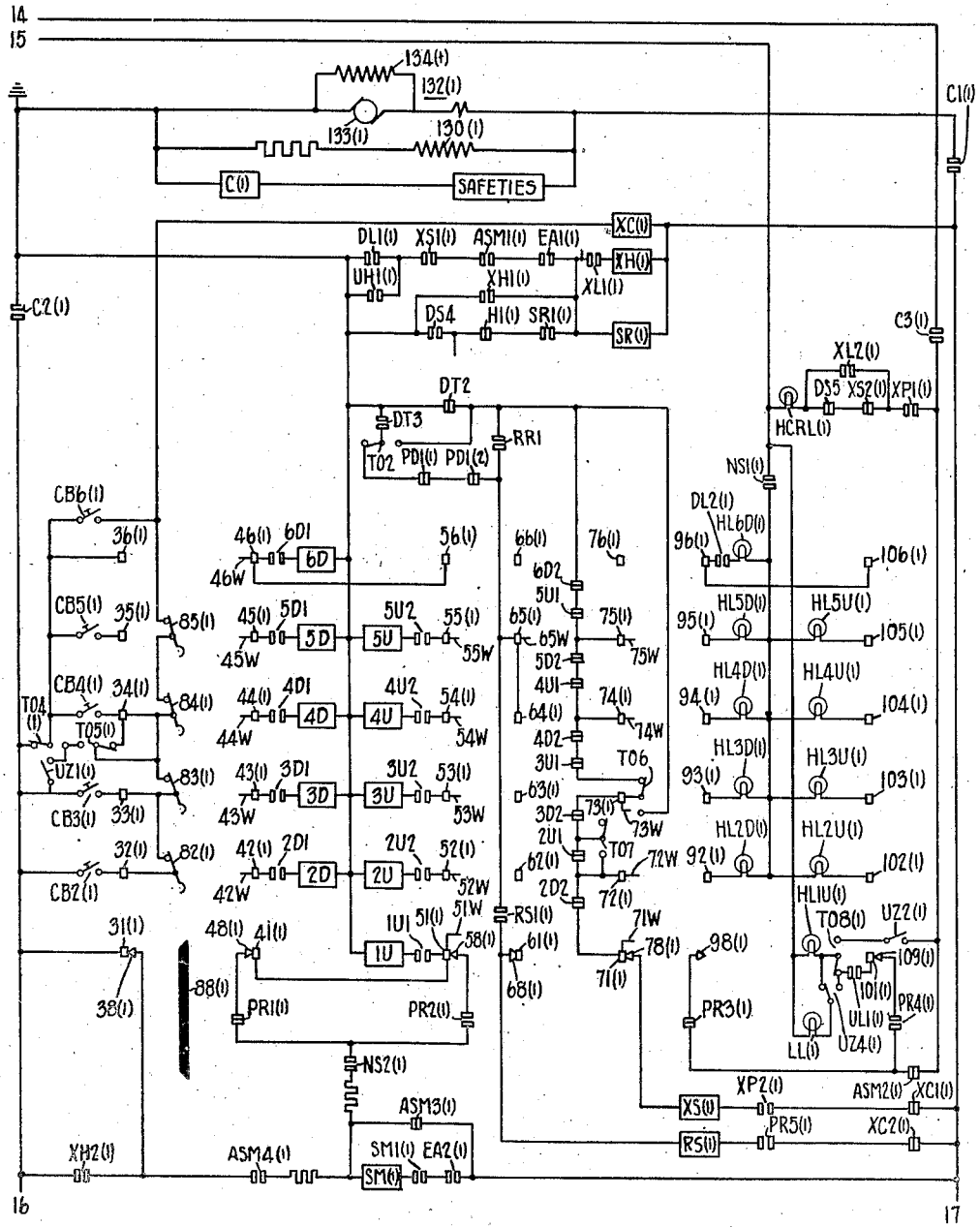
Figure 5:
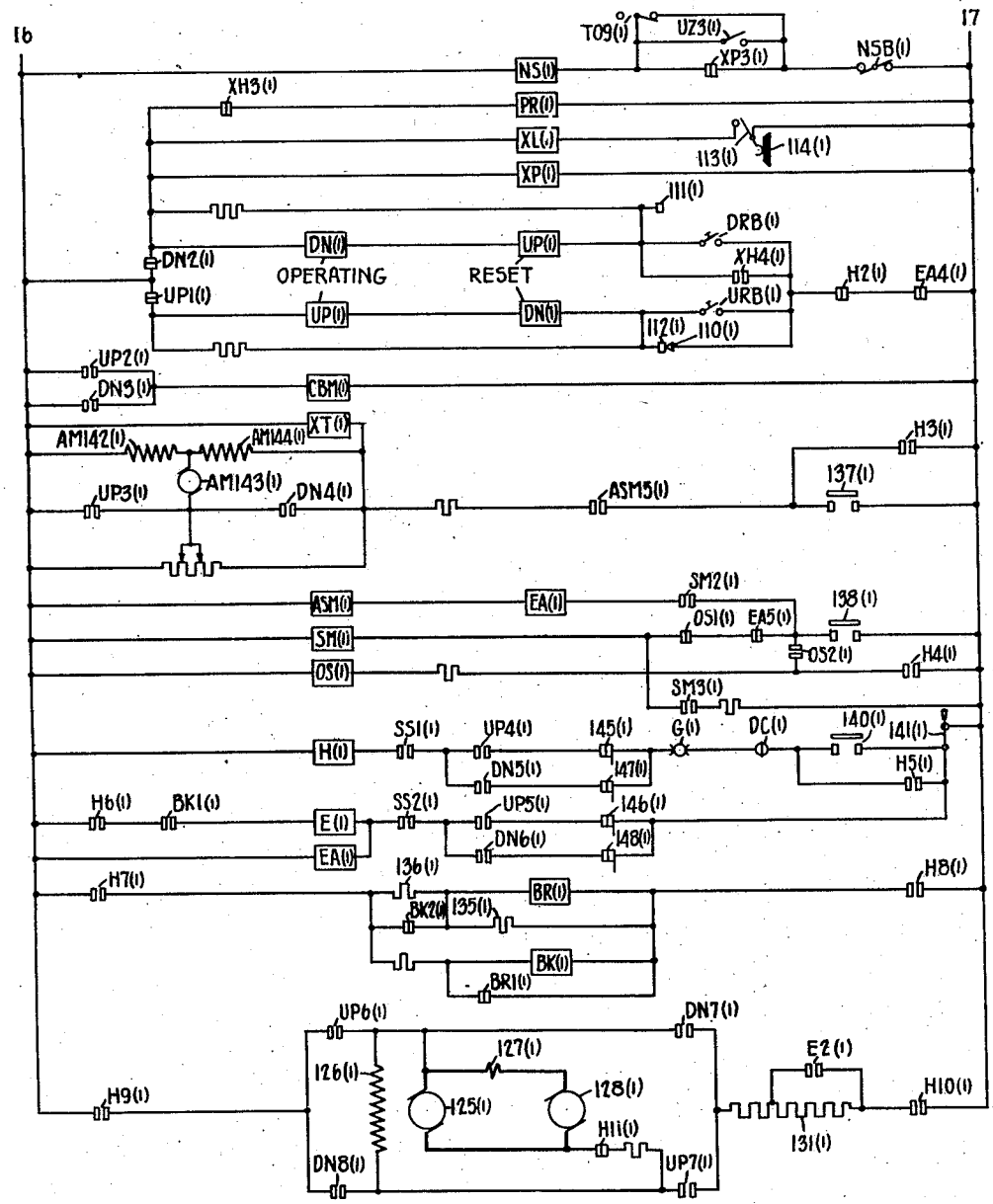

Reference may now be had to Figures 2, 3, 4 and 5, which illustrate diagrammatically the various dispatching, control and power circuits. Figures 2 and 3 show principally the dispatching circuits, these circuits being for only two cars but, as will be seen, corresponding circuits may be provided for other cars. The circuits of these figures are joined by the vertical feed lines 10, 11, 12 and 13. Figure 4 shows the highest call, call pick up and call restoring circuits. The highest car call circuits and car call pick up circuits for each of the other cars are similarly arranged. The highest hall call circuits and hall call pick up and restoring circuits for each of the other cars are similarly arranged, indication being made as to the connecting in of the floor controller contacts for the other cars. This figure also shows the hall lantern circuits for one car, the circuits for the other cars being similarly arranged. The feed lines to the hall lanterns are connected by cross wires 14 and 15 to the feed transformer 124 of Figure 2. Figure 5 shows additional control circuits and the power circuits for one elevator, it being understood that such circuits are provided also for the other elevators. The circuits of Figure 5 are joined with those of Figure 4 by vertically extending feed wires 16 and 17.

The control system illustrated has been considerably simplified. A simplified system has been shown because it facilitates disclosure of an application of the invention. It is to be understood that other control elements and safety elements may be added in making up the system and that such system is subject to many variations. For example, the invention may be applied to the control system disclosed in the patent to Waters and Glaser No. 2,074,575, dated March 23, 1937.

The electromagnetic switches employed in the system illustrated are designated as follows:

| | |
|---|---|
| AB | Signal relation relay |
| ASM | Auxiliary stopping switch |
| BK | Brake resistance relay |
| BR | Brake |
| C | Potential switch |
| CA | Call bell relay |
| DD | Down timed signal self-holding switch |
| DL | Down selective relay |
| DM | Down manual signal self-holding switch |
| DMH | Down manual signal holding relay |
| DN | Down direction switch |
| DR | Down rotary switch |
| DS | Day service switch |
| DT | Down traffic switch |
| E | Speed switch |
| EA | Auxiliary speed relay |
| H | Field and brake switch |
| MS | Timing motor stop switch |
| NS | Non-stop relay |
| OS | Operating switch sequence relay |
| PD | Top terminal relay |
| PL | Up permanent light relay |
| PR | Auxiliary direction relay |
| PU | Bottom terminal relay |
| RR | Down signal highest call return relay |
| RS | Highest call return selection relay |
| SM | Stopping magnet |
| SR | Signal highest call return switch |
| TS | Zone return switch |
| UD | Up timed signal self-holding switch |
| UH | Top terminal non-selection relay |

| | |
|---|---|
| UL | Up selective relay |
| UM | Up manual signal self-holding switch |
| UMH | Up manual signal holding relay |
| UMR | Up signal lock out relay |
| UP | Up direction switch |
| UR | Up rotary switch |
| UT | Up traffic switch |
| XC | Highest car call relay |
| XH | Automatic return relay |
| XL | Up indicator light relay |
| XP | Auxiliary up direction relay |
| XS | Highest hall call relay |
| XT | Auxiliary reset switch |

Throughout the description which follows, these letters will be applied to the coils of the above designated switches. Also, with reference numerals appended thereto, they will be applied to the contacts of these switches. Differentiation will be made between the different elevators by appending to the characters employed to designate the various elements of the system numbers indicative of the different elevators and arranged in brackets.

The up hall buttons are designated U, while the down hall buttons are designated D. Numerals are appended to these letters indicating the floors for which the buttons are provided. The hall buttons act through floor relays designated first by the numeral corresponding to the floor for which the floor relay is provided and then by the letter U or D in accordance with whether the floor relay is for an up hall button or a down hall button. The car buttons are designated CB and, as in the case of the hall buttons, have numerals appended thereto as indicative of the floor for which the car buttons are provided. As to the reversing buttons in the car, the up reversing button is designated URB and the down reversing button is designated DRB. The non-stop button in the car is designated NSB.

The hall lanterns are designated HL and are differentiated by numerals corresponding to the floors for which they are provided and by the letter U or D, in accordance with whether up or down hall lanterns, appended to the letters HL.

The circuits are shown in "straight" or "across the line" form, in which the coils and contacts of the various switches are separated in such manner as to render the circuits as simple and direct as possible. The relationship of these coils and contacts may be seen from Figures (2-4)a, (2-4)b, (3-5)a and (3-5)b, where the switches are arranged in alphabetical order and shown in spindle form. The positions of these coils and contacts in either Figure 2 or Figure 4 may be found by referring to Figure 2a-4a and Figure 2b-4b, and in either Figure 3 or Figure 5 by referring to Figure 3a-5a and Figure 3b-5b. The coils and contacts are positioned on the spindles in horizontal alignment with the corresponding elements of the wiring diagram. The electromagnetic switches are illustrated in deenergized condition, switches DN, UP, DD, UD, DM and UM, which are of the latching type, being shown in reset condition.

Mechanism actuated in accordance with movement of the elevator car is utilized in the control circuits of each elevator. Such mechanism may be in the form of a floor controller or selector machine as indicated in Figure 1 and it will be assumed that the mechanism is of the construction shown in the aforementioned patent to Waters and Glaser No. 2,074,575. Details of this mechanism are not shown as such details are given in the Waters and Glaser patent, to which reference may be made.

Each selector machine is driven preferably by means of two steel tapes attached to the car. One tape extends from the top of the car to an overhead sheave. The other tape extends from the bottom of the car around a tension sheave and then up to a second overhead sheave. The tapes are wound on the overhead sheaves in a manner similar to the winding of a measuring tape, one being wound oppositely with respect to the other. The shaft upon which the overhead sheaves are mounted drives the selector machine through a chain and sprocket. One tape is unwound as the other is wound up in effecting the driving operation.

Each selector machine comprises a crosshead which is driven by a screw, which is in turn driven by the chain and sprocket, to move in accordance with movement of the car for which the machine is provided. The crosshead carries a carriage upon which is mounted mechanism for controlling circuits to cause the car to be slowed down and stopped at a floor. Mechanism is also mounted on the carriage for causing slow down to begin at a certain distance from the floor and for causing the car to be brought to a stop as it arrives at the floor. The carriage is advanced from a neutral position with respect to the crosshead in starting the car and is brought to a stop after a certain amount of movement. Thereafter the carriage moves with the crosshead. When circuits are set up to cause the car to be slowed down, the carriage is brought to a stop. The crosshead, which moves with the car, thereafter takes up the advance of the carriage so that when the car comes to a stop, the carriage is again in neutral. This relative motion of the carriage and crosshead is utilized to control the slow down and stopping of the car.

The advance of the carriage is effected by means of a torque motor which will hereinafter be termed the advancer motor. The circuits of this motor for elevator No. 1 appear in Figure 5 where the motor is designated AM(I). Energization of the advancer motor is controlled by contacts operated by the stopping magnet. The circuits of this magnet for elevator No. 1 appear in Figures 4 and 5 where the magnet is designated SM(I). The magnet controls the extension and retraction of pawls carried by the carriage for cooperation with stopping lugs. A stopping lug is provided for each floor and is arranged on a floor bar, these floor bars being spaced in accordance with the distance between the floors for which the lugs are provided. The stopping magnet is energized in the starting operation to effect the retraction of the pawls and in doing so it engages contacts to effect the energization of the advancer motor. The advancer motor in advancing the carriage also effects the engagement of selector switches, those for elevator No. 1 appearing in Figure 5 and being designated SS1(I) and SS2(I). When a call is picked up, the stopping magnet is deenergized to cause the deenergization of the advancer motor and to extend the pawls for cooperation with the stopping lug for the floor for which the call is registered. The pawl for the direction in which the car is travelling engages the stopping lug, bringing the carriage to a stop. The crosshead continues its upward movement and, due to the relative movement between the crosshead and the carriage, effects the opening of selector switches SS2 and SS1 in sequence to effect the slow down and stopping of the car.

The travelling brushes illustrated in Figure 4 for elevator No. 1 are carried by a panel on the carriage of the selector. These brushes are arranged to cooperate with stationary contacts for the various floors arranged on the floor bars. When the car is stopped at a floor, the brushes are in engagement with their cooperating stationary contacts for that floor. Being on the advance panel, however, these brushes are advanced in starting the car, are latched in engagement with their contacts for a floor by the pawls when a call is picked up and are maintained in that condition as the advance is taken up as the car comes into the floor. Stationary contacts subject to the car buttons for elevator No. 1 in the car call pick up circuit are designated 32(1), 33(1), 34(1) and 35(1) for the second, third, fourth and fifth floors respectively, the stationary contacts 31(1) and 36(1) for the first and sixth floors being connected directly to the feed line. These contacts are engaged by brush 38(1). No car button is provided for the first floor. The arrangement for each of the other elevators is the same. Instead of providing brushes and contacts for the hall call restoring circuits separate from those for the hall call pick up circuits, as is disclosed in the aforementioned Waters and Glaser patent, for convenience the same contacts and brushes are used for both circuits with a switching arrangement to insure the desired sequence of operation. It is to be understood, however, that the same arrangement as disclosed in the Waters and Glaser patent may be employed. The stationary contacts for elevator No. 1 subject to the down hall buttons at the second, third, fourth, fifth and sixth floors and the stationary contact for the first floor in the hall call pick up and call restoring circuits are designated 41(1), 42(1), 43(1), 44(1), 45(1) and 46(1) for the first, second, third, fourth, fifth and sixth floors respectively. These contacts are engaged by brush 48(1). The stationary contacts for elevator No. 1 subject to the up hall buttons at the first, second, third, fourth and fifth floors and the stationary contact for the sixth floor in the hall call pick up and call restoring circuits are designated 51(1), 52(1), 53(1), 54(1), 55(1) and 56(1) for the first, second, third, fourth, fifth and sixth floors respectively. These contacts are engaged by brush 58(1). The arrangement of the hall call pick up and call restoring circuits for each of the other elevators is the same, the corresponding contacts for each floor being connected together by wires 42w, 43w, 44w, 45w, 46w, 51w, 52w, 53w, 54w and 55w, contact 41(1) being connected to contact 51(1) and contact 56(1) being connected to contact 46(1), so as to be subject to the floor relays. Stationary contacts 61(1), 62(1), 63(1), 64(1), 65(1) and 66(1) for the first, second, third, fourth, fifth and sixth floors respectively are arranged in the car return selection circuits for elevator No. 1 to be engaged by brush 68(1). The arrangement for each of the other elevators is the same, the corresponding contacts 65 for each car being connected together by wire 65w. Also, stationary contacts 71(1), 72(1), 73(1), 74(1), 75(1) and 76(1) for the first, second, third, fourth, fifth and sixth floors respectively are arranged in the highest hall call circuits of elevator No. 1 to be engaged by brush 78(1). The arrangement for each of the other elevators is the same, the corresponding contacts for each car being connected together by wires 71w, 72w, 73w, 74w and 75w.

As shown in Figure 4 for elevator No. 1, the selector has a plurality of hook switches 82(1), 83(1), 84(1) and 85(1), one for each of floors 2, 3, 4 and 5, and arranged on the floor bars for these floors to be engaged by a travelling cam 88(1) of insulating material also carried by the advancer panel. This cam is of a length to engage and open the hook switch for any particular floor slightly ahead of the engagement of the call pick up brushes with the stationary contacts for that floor when the car is travelling in the up direction and to engage and open the hook switch for the floor below such floor slightly ahead of the engagement of the call pick up brushes with the stationary contacts for such floor when the car is travelling in the down direction. These hook switches are subject to the control of the car buttons and are arranged in series circuit relationship in the highest car call circuit. This arrangement is the same for each elevator. The brushes 68(1) and 78(1) in the car return selection and highest hall call circuits are also of a length to engage their stationary contacts slightly ahead of the engagement of the call pick up brushes with their contacts for the corresponding floors when the car is travelling in the up direction. In addition, brush 68(1) engages its contacts shortly after the engagement of cam 88(1) with the corresponding hook switches and brush 78(1) engages its contacts shortly after the engagement of brush 68(1) with its corresponding contacts.

Stationary contacts 92(1), 93(1), 94(1), 95(1) and 96(1) for the second, third, fourth, fifth and sixth floors respectively are arranged in the circuits for the down hall lanterns of elevator No. 1 at these floors while contacts 101(1), 102(1), 103(1), 104(1), 105(1) and 106(1) for the first, second, third, fourth, fifth and sixth floors respectively are arranged in the up hall lantern circuits of elevator No. 1. Those contacts in the down hall lantern circuits are engaged by brush 98(1) while those in the up hall lantern circuits are engaged by brush 109(1). The hall lantern circuits are arranged the same for each of the other elevators.

The travelling crosshead of each selector also carries an additional brush designated 110(1) for elevator No. 1 (see Figure 5) on a panel separate from the advancer panel for engaging stationary contacts for the terminal floors designated 111(1) and 112(1) for elevator No. 1. This has to do with controlling the operation of direction switches designated UP(1) and DN(1) for elevator No. 1. An additional hook switch, designated 113(1) for elevator No. 1, (see Figure 5) is provided on the selector machine. This switch may be arranged to be operated by the cam, designated 88(1) for elevator No. 1, so as to be open when the car is at the first floor and closed when it leaves the first floor. For convenience, however, a separate cam designated 114(1) (arranged on the advancer panel) is illustrated for elevator No. 1 for operating this switch. The crosshead of each selector also carries an additional brush, designated 115(1) for elevator No. 1, on the panel separate from the advancer panel, this brush being arranged to engage stationary contacts, designated 116(1) and 117(1) for elevator No. 1, for the terminal floors. This has to do with the dispatching circuits and is shown in Figure 3.

It is believed that, rather than describe further apparatus employed for dispatching, an understanding of the invention will be facilitated by first describing the operation of starting and stopping an elevator car, say car No. 1, together with the mechanism and circuits employed. A two-position multi-blade throw-over switch is provided for controlling the service performed by the cars. It will be assumed that the blades of this switch, designated TO1, TO2, TO3, TO4, TO5, TO6, TO7, TO8 and TO9, are in the positions illustrated.

Any suitable form of power supply may be provided for the elevator motor. One of the preferred arrangements is to employ a direct current elevator motor and to cause current to be supplied to the motor at a variable voltage, as from a driven generator in accordance with Ward-Leonard principles. The generator of such arrangement has been illustrated. The driving motor for the motor generator set and control arrangement therefor have not been illustrated. It is to be understood that either a direct current or alternating current driving motor may be employed, depending upon the kind of power supplied to the building and the character of the installation, and that any suitable control arrangement therefor may be utilized, such, for example, as one embodying the principles of the arrangement disclosed in the patent to Lindquist, Waters and Glaser No. 1,997,260, granted April 9, 1935.

Polyphase alternating current power supply is illustrated, these supply lines being designated 121, 122 and 123 (see Figure 2). In such case the generator is driven by a polyphase alternating current motor. This motor also drives an exciter which is employed to supply current to the separately excited field windings of the supply generator and the elevator motor and to the brake and the coils of the various electromagnetic switches of Figure 5. Also, the call pick-up, call restoring, car return selection and highest call circuits (Figure 4) for each elevator are connected to the respective exciters, one side of each exciter being grounded for the purpose of effecting the completion of the circuits common to the cars. The hall button circuits through the operating coils of the floor relays are connected through a transformer 124 to the source of supply for the building so as to permit the operation of the floor relays at any time.

The armature of the generator of the motor generator set is designated 125(1), its separately excited field winding being designated 126(1) and its series field winding 127(1). The armature of the elevator motor is designated 128(1) and its separately excited field winding 130(1). A resistance 131(1) is provided for controlling the strength of the generator separately excited field and therefore the voltage applied to the elevator motor armature. The armature of the exciter 132(1) driven by the motor generator set driving motor is designated 133(1) while its field winding is designated 134(1). 135(1) is a discharge resistance for the brake release coil BR(1), while resistance 136(1) serves as a cooling resistance for this coil.

The contacts operated by the car gate and engaged when the gate is closed are designated G(1). The door contacts operated by the various doors are arranged in series relation. These contacts are not closed until the doors are closed and locked. For convenience these door contacts are shown as a single pair of contacts designated DC(1). The car gate and hatchway doors for each elevator have not been shown but it is to be understood that they may be power operated, for example as disclosed in the aforementioned patent to Waters and Glaser, No. 2,074,575. The start control switch in the car has a plurality of contacts designated 137(1), 138(1) and 140(1). 141(1) is the safety switch in the car.

The system is illustrated for the condition where both cars are standing at the first floor. When car No. 1 last arrived at the first floor, brush 110(1) engaged stationary contact 112(1) and, upon the engagement of contacts H2(1) in the stopping operation, a circuit was established for the reset coil of down direction switch DN(1) and for the operating coil of up direction switch UP(1). This caused the down direction switch DN(1) to be reset, the condition in which it is shown in the drawings, and the operation of up direction switch UP(1) and latching of this switch in operated condition. The operation of switch UP(1) caused the engagement of contacts UP2(1), UP3(1), UP4(1), UP5(1), UP6(1) and UP7(1) and the separation of contacts UP1(1). Contacts UP1(1) disconnected the operating coil of up direction switch UP(1) and the reset coil of down direction switch DN(1) from the feed lines. Contacts UP2(1) reconnected the car button magnet CBM(1) to the supply lines. Contacts UP3(1) connected field winding AM142(1) and armature AM143(1) of the advancer motor in parallel.

Assume that the driving motor of the motor generator set is started in operation. This causes the exciter voltage to build up to full value. As it does, the potential switch C(1) operates. engaging contacts C1(1), C2(1), and C3(1). The engagement of contacts C1(1) and C2(1) completes a circuit for the car button magnet CBM(1) and for the coils of non-stop relay NS(1), auxiliary direction relay PR(1) and auxiliary up direction relay XP(1). The non-stop relay engages contacts NS1(1) and NS2(1). The auxiliary direction relay engages contacts PR2(1), PR4(1), PR5(1) and PR6(1) and separates contacts PR1(1) and PR3(1). The auxiliary up direction relay engages contacts XP1(1) and XP2(1) and separates contacts XP3(1). The elevator motor field winding 130(1) is connected across the exciter so that the strength of the elevator motor field builds up as the exciter voltage builds up.

To start the car, the start control switch is thrown to full running position. This causes the bridging of contacts 137(1), 138(1) and 140(1), contacts 138(1) being bridged ahead of contacts 137(1) and 140(1). The bridging of contacts 138(1) completes circuits (not shown) causing the closing of the car gate and first floor hatchway door. It also completes a circuit for the operating coil of stopping magnet SM(1) through contacts OS1(1) and EA5(1). The stopping magnet upon operation engages contacts SM1(1), SM2(1) and SM3(1). Contacts SM3(1) complete a holding circuit for the operating coil of the stopping magnet. Contacts SM2(1) complete a circuit for the coil of auxiliary stopping switch ASM(1) and for one coil of auxiliary speed relay EA(1). Relay EA(1) does not operate at this time. Switch ASM(1) operates to separate contacts ASM2(1) and ASM3(1) and to engage contacts ASM1(1), ASM4(1) and ASM5(1). Contacts ASM5(1) prepare the circuit for the advancer motor AM(1), which is completed by the bridging of start control switch contacts 137(1), this circuit being through field winding AM144(1) and through field winding AM142(1) and armature AM143(1) in parallel. This results in the operation of the advancer motor to advance the carriage in the up direction. The advancer motor also effects the engagement of selector switches SS1(1) and SS2(1), preparing the circuits for the coils of field and brake switch H(1) and speed switch E(1) and completing the circuit for a second coil of the auxiliary speed relay EA(1).

The energization of both coils of relay EA(1) causes this relay to operate to engage contacts EA1(1) and EA2(1) and to separate contacts EA3(1), EA4(1) and EA5(1). Contacts EA2(1) are in the circuit for the neutralizing coil of relay SM(1) of the stopping magnet, the advance having progressed sufficiently by this time for the brushes to be off the stationary contacts for the floor at which the car is positioned. The separation of contacts EA4(1) prevents energization of the direction switches once the advancer mechanism has been energized to advance the carriage. Contacts EA5(1) prevent reoperation of the stopping magnet once a call has been picked up after the car has come to a stop at the floor for which the call is registered. This is especially useful in cases where the advancer mechanism advances the brushes into engagement with their stationary contacts for the floor beyond before starting of the car takes place, as, for example, in the system of the Waters and Glaser patent previously referred to.

The advance takes place fairly rapidly so that, upon the closure of the hatchway door and car gate, a circuit is established for the coil of field and brake switch H(1) through contacts SS1(1), UP4(1), up limit switch 145(1), gate contacts G(1), door contacts DC(1), start control switch contacts 140 (1) and safety switch 141(1).

Switch H upon operation engages contacts H3(1), H4(1), H5(1), H6(1), H7(1), H8(1), H9(1) and H10(1) and separates contacts H1(1), H2(1) and H11(1). The separation of contacts H2(1) prevents operation of the direction switches during operation of the car. Contacts H3(1) by-pass start control switch contacts 137(1) in the advancer motor circuit. Contacts H4(1) complete the circuit for the coil of operating switch sequence relay OS(1). The operation of operating switch sequence relay OS(1) causes the engagement of contacts OS2(1) and the separation of contacts OS1(1). The engagement of contacts OS2(1) completes a holding circuit for the coil of auxiliary stopping relay ASM(1). Contacts H5(1) by-pass start control switch contacts 140(1), establishing a self-holding circuit for the coil of switch H. Thus with its contacts all by-passed, the start control switch may be returned to "off" position. Contacts H6(1) further prepare the circuit for the coil of speed switch E(1). Contacts H7(1) and H8(1) complete the circuit for brake release coil BR(1), while contacts H9(1) and H10(1) complete the circuit through contacts UP6(1) and UP7(1) for the generator field winding 126(1). Contacts H11(1) disconnect the generator field winding from across the generator armature. The completion of the circuit for the generator separately excited field winding causes current to be supplied from the generator armature 125(1) to the hoisting motor armature 128(1) and, the brake being released as a result of the energization of its release coil BR(1), the elevator motor starts the car in the up direction.

The brake, upon being released, effects the separation of contacts BR1(1), which act to remove the short circuit for the coil of brake resistance relay BK(1). This relay operates to separate its contacts BK2(1) to insert cooling resistance 136(1) in circuit with brake release coil BR(1). It also engages contacts BK1(1), which completes the circuit for the coil of speed switch E(1) through the contacts H6(1), SS2(1), UP5(1), up limit switch 146(1) and safety switch 141(1). Switch E(1) upon operation engages contacts E2(1) to short-circuit a portion of resistance 131(1) in the circuit of the generator field winding 126(1). This applies full voltage to the generator separately excited field winding, causing the generator voltage to build up to full value to bring the elevator car up to full speed.

The car is started in the down direction in a similar manner. To set the car for downward travel, up direction switch UP(1) is reset and down direction switch DN(1) is operated. The manner in which this is effected will be seen from later description. Assuming that the car has been set for downward travel, upon operation of the start control switch, the circuit for the advancer motor AM(1) is completed through field winding AM142(1) and through field winding AM144(1) and armature AM143(1) in parallel, connected thus by contacts DN4(1), moving the advance panel downwardly instead of upwardly. The circuit for the coil of switch H(1) is through the contacts DN5(1) and down limit switch 147(1) and the circuit for the coils of switch E(1) and relay EA(1) is through contacts DN6(1) and down limit switch 148(1). The circuit for the generator field winding is through contacts DN8(1) and DN7(1) so that the excitation of the generator is opposite to that previously described, causing the car to be started in the down direction instead of the up direction. It is believed that the remainder of the starting operation will be understood from the description given of starting the car in the up direction.

Stops during upward travel of the car are made in response to car buttons and up hall buttons. For convenience, assume that a passenger entered the car at the first floor desiring to be carried to the third floor. Upon the passenger announcing his destination, the car attendant presses car button CB3(1), this button when released being held in operated condition by car button magnet CBM(1). Upon the engagement of brush 38(1) with stationary contact 33(1), a circuit is completed through contacts ASM4(1), SM1(1) and EA2(1) for neutralizing coil SM(1) of the stopping magnet. This coil acts to oppose the operating coil of magnet SM(1), releasing the pawls and causing the separation of contacts SM1(1), SM2(1) and SM3(1). Contacts SM1(1) and SM3(1) break the energizing circuits for the coils of the stopping magnet, while contacts SM2(1) break the circuit for the coil of the auxiliary stopping switch ASM(1) and one coil of auxiliary speed relay EA(1). The auxiliary stopping switch separates contacts ASM1(1), ASM4(1) and ASM5(1) and reengages contacts ASM2(1) and ASM3(1). Contacts ASM4(1) disconnect brush 38(1) from the supply line. Contacts ASM5(1) deenergize the advancer motor AM(1). Contacts ASM2(1) complete a circuit through contacts PR4(1) and brush 109(1), now in engagement with contact 103(1), for the up third floor hall lantern HL3U(1) to indicate that a stop is to be made at the third floor by car No. 1 travelling upwardly. Relay EA(I) does not drop out on deenergization of its coil in series with the coil of switch ASM(I), being held in operated condition by its coil in parallel with the coil of speed switch E(I).

As the car continues its upward travel, the up pawl engages the third floor stopping collar, causing the opening of selector switches SS2(I) and SSI(I) in sequence. The opening of switch SS2(I) breaks the circuit for the other coil of relay EA(I), which drops out. It also breaks the circuit for the coil of speed switch E(I), which drops out, separating contacts E2(I) to reinsert resistance 131(I) in the circuit of the generator field winding. This decreases the voltage of the generator, causing the car to slow down.

The opening of switch SSI(I), which occurs as the car arrives at the landing, breaks the circuit for the coil of field and brake switch H(I), which drops out. The resultant separation of contacts H7(I) and H8(I) deenergizes brake release coil BR(I) and the separation of contacts H9(I) and H10(I) disconnects the generator separately excited field winding 126(I) from the feed lines. Thus the external excitation of the generator is discontinued and the brake is applied to bring the car to a stop at the third floor landing. The engagement of contacts H11(I) reconnects the separately excited field winding across the generator armature substantially to destroy the residual flux of the generator field.

The separation of contacts H7(I) and H8(I) also breaks the circuit for the coil of brake resistance relay BK(I), which drops out. The separation of contacts H4(I) breaks the circuit for the coil of operating switch sequence relay OS(I), provided the start control switch has been returned to neutral position. However, if the start control switch is held in position where contacts 138(I) are bridged, switch OS(I) remains energized upon the separation of contacts H4(I) so that contacts OSI(I) remain separated to prevent the reoperation of stopping switch SM(I). This prevents a restarting operation unless the start control switch is returned to neutral.

Similar operation is had in case an up hall button is pressed. Assume, for example, that up hall button U2 at the second floor is pressed before brush 58(I) engages contacts 52(I). When such engagement takes place, a circuit is completed for neutralizing coil SM(I) of the stopping magnet, this circuit being through restoring coil 2U and contacts 2U2 of the up second floor relay, second floor stationary contacts 52(I), brush 58(I), contacts PR2(I), contacts NS2(I), coil SM(I), contacts SMI(I) and contacts EA2(I). This causes the resetting of stopping magnet SM, causing the car to be slowed down and brought to a stop at the second floor. The reengagement of contacts ASM3(I), caused by the dropping out of the stopping magnet, short-circuits neutralizing coil SM(I), increasing the current supplied to the restoring coil 2U of the up second floor relay, causing this relay to be reset.

During upward travel of the car, stops are made in response to car buttons and up hall buttons for floors above the car in the order in which the floors are reached by the car, regardless of the order in which the buttons are pressed. Similarly, during downward travel of the car, stops are made in response to car buttons and down hall buttons for floors below the car in the order in which the floors are reached by the car, regardless of the order in which the buttons are pressed. It is believed that stops in response to car buttons during downward travel will be understood from the previous description inasmuch as when a car button is pressed it is maintained operated by the car button magnet CBM(I) so that upon the engagement of brush 38(I) with the contact rendered "alive" by this button, the neutralizing coil of the stopping magnet is energized, and the car is caused to slow down and come to a stop at the floor. Similarly, each down hall button that is pressed operates a down floor relay that remains operated until the contact rendered "alive" thereby is engaged by brush 48(I) to pick up the call, brush 48(I) being rendered effective for downward travel of the car by contacts PR1(I). This causes the stopping magnet to drop out and the floor relay to be reset and the car to be slowed down and brought to a stop at the floor at which the button is located. When a stop is to be made at a floor during down car travel, the down hall lantern at that floor is lighted upon the reengagement of contacts ASM2(I), the circuit being through contacts PR3(I) and brush 98(I) in engagement with its stationary contact for the floor at which the stop is to be made.

When the car becomes filled to capacity, nonstop button NSB(I) is pressed, deenergizing non-stop relay NS(I). This relay drops out to separate contacts NS2(I), rendering brushes 48(I) and 58(I) ineffective to pick up hall calls. The car buttons, however, are unaffected by the nonstop button and stops are made to discharge passengers. Relay NS(I) also separates contacts NSI(I) to prevent the lighting of the hall lanterns.

The operation of the other elevators is the same as that of elevator No. 1. Each of the other elevators responds to its own car buttons and also answers hall calls, the particular elevator answering any particular hall call being the first one set for travel in the direction corresponding to the call registered whose brush for that direction of travel engages its stationary contact corresponding to the hall button pressed.

Having described the operations of starting and stopping a car, the dispatching of the cars will now be described. In the arrangement illustrated a supply generator is provided for supplying current to certain of the dispatching mechanisms. The armature of this generator is designated 150, the self-excited field winding 151 and the series field winding 152. This generator is driven by a three-phase alternating current motor, the rotor of which is designated 153 and the stator windings 154, 155 and 156.

The cars are started on their upward and downward trips upon receipt of starting signals. These are given at timed intervals by the operation of a timing motor. The armature of this motor is designated TM157 and the field winding TM158. The speed of this motor may be controlled by a manually operable switch 160 comprising a pivoted contact arm for engaging stationary contacts to vary the amount of resistance 161 in shunt with the motor armature. The timing motor operates switches TM162, TM163, TM164, TM165 and TM166, each switch being closed once each revolution of a shaft driven by the motor so as to operate at regular time intervals. The purposes of these switches will be explained later. The timing mechanism may be of the construction disclosed in the patent to Larson, No. 1,966,071, granted July 10, 1934.

The rotary switches, UR and DR, are of the notching type. Each switch is provided with a pair of brushes, those for the up rotary switch being designated URB1 and URB2 and those for the down rotary switch being designated DRB1 and DRB2. These brushes are rotated in step by step movement by successive energization of the switch operating coil. Each brush enegages a plurality of stationary contacts, one for each elevator, engaging one contact at a time upon each step of rotative movement. The contacts engaged by brush DRB1 are desigted DRC1(1) and DRC1(2); those engaged by brush DRB2 are designated DRC2(1) and DRC2(2); those engaged by brush URB1 are designated URC1(1) and URC1(2); and those engaged by brush URB2 are designated URC2(1) and URC2(2).

There are a plurality of control switches located on the starter's panel. These include up traffic button UTB, down traffic button DTB, up-down traffic button UDTB, up start signal button USB, down start signal button DSB, individual cut-out switches ICO(1) and ICO(2), day and night key switch DNK, signal relation switch SRS, and manual zone return control switch ZRS. There are also a plurality of signals on the starter's panel. These include an up timer light UTRL and a down timer light DTRL for indicating that the timing mechanism has operated; and up starting light USLS and down starting light DSLS for each elevator for indicating the cars which have received the starting signals, and an up traffic light UTL and a down traffic light DTL for indicating the traffic conditions for which the mechanism is set.

There are also signals in the elevator cars. The up starting light USLC and down starting light DSLC in each car are given to advise the car attendant to start. An up gong UG and a down gong DG are provided in each car to supplement the visual starting signals. Each car is also provided with a loading light LL which advises the attendant in a car at the lower terminal that his car is to be the next to receive a starting signal, and a highest call return light HCRL which goes out to advise the attendant when his car becomes set for downward travel. There is also a buzzer BUZ in the car which is utilized on night service. This buzzer is controlled by manually operable buzzer switch MBS in the car. The buzzers are fed through transformer 168 from the alternating current supply lines.

TOM1 and TOM2 are throw-over switch motors for operating the throw-over switches, previously mentioned. SCO is a service cut-out switch on the control panel for cutting out the dispatching mechanism when it is desired to do service work on the system.

To start the dispatching mechanism in operation, day and night key switch DNK at the starter's station is closed. This completes a circuit for the coil of day service switch DS. Switch DS operates to engage contacts DS1 and DS2, completing the circuit for the stator windings 154, 155 and 156 of the driving motor for the supply generator for the dispatching circuits, starting this motor generator set in operation. As the voltage builds up, the timing motor TM starts in operation.

For convenience of description, assume a period in which there is traffic in both the up and the down direction. For such conditions the up-down traffic button UDTB at the starter's station is closed. This completes a circuit for both the up traffic light UTL and the down traffic light DTL at the starter's station and also for the coils of up traffic switch UT and down traffic switch DT. Switch UT engages contacts UT2 to establish a holding circuit for its coil and for the up traffic light. Similarly, switch DT engages contacts DT4 to establish a holding circuit for its coil and for the down traffic light. Thus button UDTB may now be released. Switch DT separates contacts DT1 which drops out switch UH, operated upon application of power to the supply mains. Switch UT separates contacts UT1, preventing the completion of the circuit for the coil of zone return relay TS. Switches UT and DT also engage contacts UT3 and DT5, preparing the circuits for further dispatching mechanism.

Assume that both car No. 1 and car No. 2 are at the lower terminal at this time. Under such conditions, selector brushes 115(1) and 115(2) are in engagement with stationary contacts 116(1) and 116(2) respectively so that the engagement of contacts UT3 and DT5 complete the circuits for the coils of bottom terminal relays PU(1) and PU(2) of elevators Nos. 1 and 2 respectively. Contacts PR6 of the auxiliary direction relay of each elevator in the circuit for coil PU of that elevator are closed because the car is set for travel in the up direction and are provided to prevent operation of the bottom terminal relay in case the car is set for downward travel at the lower terminal, as for example where a basement floor is provided. The operation of the bottom terminal relays causes separation of contacts PU2(1) and PU2(2) and the engagement of contacts PU1(1), PU1(2), PU3(1) and PU3(2). Assuming that brush URB1 of the up rotary switch is in engagement with stationary contact URC1(1) for elevator No. 1 at this time, no operation of the rotary switch takes place due to the fact that the circuit for its coil is broken at contacts PU2(1). Thus car No. 1 is selected to be the first to start from the lower terminal. Had brush URB1 been in engagement with contact URC1(2) for elevator No. 2 instead, no operation of the up rotary switch would have taken place because the circuit would have been broken at contacts PU2(2). Under such conditions car No. 2 would have been selected as the first to leave.

With car No. 1 selected as the first to leave the lower terminal, the other brush URB2 of the up rotary switch is in engagement with stationary contact URC2(1) for elevator No. 1 so that the circuit for the coil of elevator No. 1 up selective switch UL(1) is completed through contacts PU3(1) to register the selection. Switch UL(1) upon operation engages contacts UL1(1), UL2(1) and UL3(1). The engagement of contacts UL1(1) completes a circuit through contact 101(1), brush 108(1), contacts PR4(1), ASM2(1) and C3(1) for elevator No. 1 up hall lantern HL1U(1) at the lower terminal and loading light LL(1) in the car. Thus both the car attendant and intending passengers are advised that car No. 1 is to be the first to leave the lower terminal.

Upon the closing of timing motor switch TM162. a circuit is completed through contacts UT4 of the up traffic switch for the operating coil of up timed signal self-holding switch UD, this switch being latched in operated condition and being provided with a reset coil. Switch UD upon operation engages contacts UD1, UD2, UD3 and UD4. Contacts UD4 complete a circuit for the up timer light UTRL at the starter's station, advising the starter that the timer has given an up signal. These contacts also complete a circuit through contacts UL3(1) for the up starting light USLS(1) for car No. 1 at the starter's station, further advising the starter that car No. 1 is the one that has been given the up starting signal, and for the up starting light USLC(1) and gong UG(1) in car No. 1, advising the car attendant to start his car.

Upon the movement of the start control switch in the car to start position, the bridging of contacts 138(1) to effect the closing of the car gate and hatchway door causes the operation of auxiliary stopping switch ASM(1) as previously explained. This switch separates contacts ASM2(1) to discontinue the lighting of the loading light in the car and also the up hall lantern at the first floor to warn any further intending passengers not to try to get on the car. Also, the bridging of start control switch contacts 137(1) causes the energization of the coil of auxiliary reset switch XT(1) which engages contacts XT1(1), completing a circuit through contacts UL2(1) and UD3 for the reset coil of up timed signal self-holding switch UD. This resets switch UD, causing the separation of contacts UD4 to break the circuit for the up timer light UTRL and up starting lights USLS(1) and USLC(1) and up gong UG(1). As the car leaves the first floor, switch 113(1) closes, completing a circuit for the coil of up indicator light relay XL(1). This relay engages contacts XL2(1) to complete a circuit for highest call return light HCRL(1) to indicate that the car is travelling in the up direction.

Contacts EA3(1) separate in the starting operation to break the circuit for the coil PU(1) of the bottom terminal relay, causing this relay to drop out, the separation of contacts EA3(1) occurring before the disengagement of brush 115(1) from stationary contact 116(1) as the car leaves the first floor. Inasmuch as car No. 2 is at the first floor under the assumed conditions and its bottom terminal relay PU(2) is operated, the dropping out of relay PU(1) to reengage contacts PU2(1) completes a circuit through contacts PU1(2), stationary contacts URC1(1), brush URB1 and contacts UR1 for the coil of up rotary switch UR. This switch operates to notch brush URB1 into engagement with stationary contacts URC1(2) for elevator No. 2. The coil of the rotary switch is deenergized upon completion of a notching operation by the separation of contacts UR1. The separation of contacts UR1 is only momentary but their reengagement, with brush URB1 in engagement with contact URC1(2), does not reestablish the circuit for the coil of up rotary switch UR for further notching operations owing to the fact that the circuit is open at contacts PU2(2). Thus car No. 2 is selected to be the next car to leave the lower terminal floor.

Brush URB2 of the up rotary switch is moved along with brush URB1, brush URB2 coming to rest in engagement with contacts URC2(2). Inasmuch as contacts PU3(2) are in engagement, this completes a circuit for the coil of elevator No. 2 up selective switch UL(2) to register the selection of car No. 2. Switch UL(2) upon operation completes a circuit for the up hall lantern and loading light for elevator No. 2 to advise the car attendant and intending passengers that car No. 2 is to be the next to leave the lower terminal. Thereafter, upon reclosing of timing switch TM162, up time signal self-holding switch UD is again operated to engage contacts UD4. This completes a circuit for light UTRL at the starter's station and also completes a circuit through contacts UL3(2) for starting lights USLS(2) and USLC(2) and gong UG(2) to give the signals to the starter and car attendant for the starting of car No. 2 from the lower terminal.

Incident to the starting of car No. 2 from the lower terminal, the loading light in the car and first floor hall lantern are extinguished. Also, contacts XT1(2) complete a circuit through contacts UL2(2) for the reset coil of switch UD which is reset to effect the operation of contacts UD4, breaking the circuit for lights UTRL, USLS(2) and USLC(2) and gong UG(2). Also, bottom terminal relay PU2 drops out but inasmuch as there is no other car at the lower terminal the up rotary switch UR is not operated to select another car.

Under the conditions of operation assumed, the cars are started on their downward trip upon receipt of down starting signals. With an even number of cars in service, signal relation switch SRS is open so that signal relation switch AB is deenergized. Under such conditions contacts AB1 are in engagement so that the down start signal is given in response to the closing of timing motor operated switch TM163. This switch is preferably set to close at the same time as switch TM162.

Assume that car No. 1 arrives at the top terminal before the closing of switch TM163 occurs. As the car reaches the upper terminal, brush 110(1) engages contacts 111(1) and upon the reengagement of contacts EA4(1) and H2(1) as the car comes to a stop, a circuit is completed through contacts DN2(1) for the operating coil of down direction switch DN(1) and reset coil of up direction switch UP(1), causing the car to be set for travel in the down direction. Incident to this operation contacts DN2(1) separate, breaking the circuit for the coil of direction relays PR(1) and XP(1) and up indicator light relay XL(1). The dropping out of contacts XL2(1) and XP1(1) break the circuit for the coil of highest call return light HCRL(1) to indicate that the car is no longer set for travel in the up direction.

Also, as the car reaches the upper terminal, brush 115(1) engages contacts 117(1), completing a circuit for the coil of top terminal relay PD(1). This relay operates to separate contacts PD1(1) and PD3(1) and to engage contacts PD2(1) and PD4(1). Assuming that brush DRB1 of the down rotary switch is in engagement with stationary contact DRC1(1) at this time, no operation of the rotary switch takes place due to the fact that the circuit for its coil is broken at contacts PD3(1) before the engagement of contacts PD2(1) takes place. Thus car No. 1 is selected to leave the upper terminal. Had brush DRB1 been in engagement with contact DRC1(2) instead, the down rotary switch would operate to notch its brush into engagement with contact DRC1(1) to select car No. 1 to leave the upper terminal.

With car No. 1 selected, a circuit is completed through contacts PD4(1), stationary contact DRC2(1), and down rotary switch brush DRB2 for the coil of elevator No. 1 down selector switch DL(I). This switch upon operation engages contacts DLI(I), DL2(I), DL3(I) and DL4(I). The engagement of contacts DL2(I) completes a circuit for the down hall lantern HL6D(I) at the top floor.

Upon the closing of timing motor switch TM163, a circuit is completed through contacts AB1 and DT6 for the operating coil of down timed signal self-holding switch DD, this switch being latched in operated condition and being provided with a reset coil. This switch upon operation engages contacts DD1, DD2, DD3 and DD4. Contacts DD3 complete a circuit through contacts DT8 and SR2(I) and SR2(2) for the coil of down signal highest call return relay RR. This relay upon operation engages contacts RR1, RR2, RR3 and RR4. Contacts RR4 complete a circuit for the down timer light DTRL at the starter's station, advising the starter that the timer has been given a down signal. These contacts also complete a circuit through contacts XL4(I) and contacts DL4(I) for down starting light DSLS(I) for car No. 1 at the starter's station, further advising the starter that car No. 1 is the one that has been given the down starting signal, and for the down starting light DSLC(I) and gong DG(I) for car No. 1, advising the car attendant to start his car.

Upon operation of the start control switch to start the car, switch ASM operates as previously described to break the circuit for the down hall lantern at the top floor. Upon the engagement of contacts E1(I) and the starting of the car away from the upper terminal, a circuit is completed through contacts XL3(I), DL3(I) and DD4 for the reset coil of switch DD, causing this switch to be reset. Switch DD separates contacts DD3 to deenergize the coil of down signal highest call return relay RR, which separates contacts RR4 to cause the discontinuance of the giving of the down signals. The top terminal relay PD(I) is dropped out as brush 115(I) disengages contact 117(I) as the car moves away from the upper terminal. Similar operation is had in the event that car No. 2 arrives at the upper terminal before the time arrives for the giving of the starting signal.

When the timing motor operated switch TM163 closes before a car arrives at the top terminal, a down starting signal may be given to a car at a floor below in the event the car has reached its highest call. In the system as shown, a down start signal is given to a car at a floor in a selection zone (at the fourth or fifth floor with the circuits as shown), provided the timing mechanism has operated to close switch TM163, provided the car has reached its highest call (car call or hall call) and provided further that there is no car at the top floor. When no car button is pressed for the fourth, fifth or sixth floor as the car approaches the fourth floor, contacts XC1(I) and XC2(I) of the highest car call relay are closed. Thus, upon the engagement of brush 68(I) with fourth floor stationary contact 64(I), a circuit is completed through contacts DT3, throw-over switch TO2, contacts PD1(I) and PD1(2), closed because no car is at the top terminal, contacts 64(I), brush 68(I), contacts PR5(I) and contacts XC2(I) for the coil of highest call return selection relay RS(I). This relay upon operation engages contacts RS1(I), RS2(I), and RS4(I) and separates contacts RS3(I). Contacts RS1(I) establish a self-holding circuit for the coil. If brush DRB(I) of the down rotary switch is in engagement with stationary contact DRC1(I) for elevator No. 1, the separation of contacts RS3(I) prevents the operation of the down rotary switch DR upon engagement of contacts RS2(I), thereby selecting car No. 1 as the one to receive the down start signal. If this brush is in engagement with some other contact, as for example DRC1(2), the engagement of contacts RS2(I) completes a circuit through contacts RS3(2) and contacts PD3(2) to energize the coil of the down rotary switch to effect the notching of the brush in engagement with contact DRC1(I) to select car No. 1. The engagement of contacts RS4(I) completes a circuit for the coil of down selective relay DL(I) through contact DRC2(I) and brush DRB(2), thereby registering the selection. If no hall call is registered for a floor above the fourth floor and an up fourth floor hall call is not registered, upon the engagement of brush 78(I) with stationary contact 74(I) as the car approaches the fourth floor, a circuit is completed for the coil of highest hall call relay XS(I), provided the timing mechanism has operated to close switch TM163 and no car is at the upper terminal. This circuit is through contacts DT3, throw-over switch TO2, contacts PD1(I), PD1(2), closed because no car is at the top terminal, contacts RR1, closed as a result of the closing of switch TM163 as previously described, floor relay contacts 6D(2), 5U(I), 5D(2) and 4U(I), closed because no call is registered by any one of these floor relays, stationary contact 74(I), brush 78(I), coil XS(I), contacts XP2(I) and contacts XC1(I).

If car button CB4(I) is pressed for the fourth floor, this completes a circuit through hook switches 84(I) and 85(I) for the coil of highest car call relay XC(I). As the car approaches fourth floor, cam 88(I) opens hook switch 84(I), thus reaching its highest car call. This breaks the circuit for the coil of XC(I) so that the operation previously described is obtained. However, if the fifth floor car button CB5(I) is pressed, the operation is modified. The pressing of this button causes the operation of relay XC(I) to prevent the establishment of the circuits for the coils of either relay RS(I) or relay XS(I) as the car approaches the fourth floor. As the car reaches the fifth floor car call, hook switch 85(I) opens to break the circuit for relay XC(I). This permits the completion of the circuit for the coil of relay RS(I) through brush 68(I) and fifth floor contact 65(I). It also permits the completion of the circuit for the coil of relay XS(I) through brush 78(I) and fifth floor contact 75(I).

If a down fifth floor hall call has been registered, contacts 5D2 are separated, preventing the establishment of the circuit for the coil of relay XS(I) until the car approaches the fifth floor and brush 78(I) engages fifth floor stationary contact 75(I), thereby reaching its highest hall call. If an up fourth floor hall call has been registered, contacts 4U1 are separated to prevent the energization of the coil of relay XS(I) upon the engagement of brush 78(I) with stationary contacts 74(I). While the up fourth floor relay is reset incident to the picking up of the call for the fourth floor, this reset operation is effected by the reengagement of contacts ASM3(I) to increase the flow of current through the restoring coil 4U. The auxiliary stopping switch also separates contacts ASM1(I) to prevent the completion of the circuit for the coil of automatic return relay XH(I) should highest hall call relay XS(I) be operated as a result of the reengagement of contacts 4U1. This prevents the car being set for down travel so that a passenger entering the car at the fourth floor may be carried to a floor above. As soon as the car button for a floor above is pressed, the circuit for the coil of relay XC(I) is broken so that the circuit for the coil of XS(I) cannot be established until the car reaches the floor for which this car button is pressed. A similar operation is had in the event that the up fifth floor hall button has been pressed. If the sixth floor car button or sixth floor hall button has been pressed to prevent the completion of the circuit for the coil of relay XS(I) upon the engagement of brush 78(I) with stationary contacts 75(I), the circuit for the coil of relay XS(I) is not completed at all owing to the fact that contact 76(I) is not connected in the circuit to effect the energization of this coil.

Relay XS(I) upon operation engages contacts XSI(I) and separates contacts XS2(I). Assume that this operation occurs as the car approaches the fourth floor. Contacts XSI(I) complete a circuit through contacts DLI(I), closed because car No. 1 has been selected, and contacts ASMI(I), EAI(I) and XLI(I), closed because the car is set for upward travel, for the coils of automatic return relay XH(I) and signal highest call return switch SR(I). This relay upon operation engages contacts XHI(I), XH2(I) and XH4(I) and separates its contacts XH3(I). Contacts XHI(I) establish a holding circuit for these coils. Switch SR engages contacts SRI(I) to prepare a self-holding circuit through contacts HI(I) and DS4 and engages contacts SR3(I) to complete a circuit through contacts RR3 and DD4 for the reset coil of switch DD to effect the reset of this switch. Switch DD upon dropping out separates contacts DD3 to deenergize the coil of relay RR, which separates contacts RRI to break the circuit for the coil of relay XS. Contacts XH3(I) deenergizes the coil of auxiliary direction relay PR(I). Relay PR(I) separates contacts PR5(I) to deenergize relay RS(I). Relay RS(I) separates contacts RS4(I) to deenergize selective relay DL(I). Relay DL(I) in turn separates contacts DLI(I) in the circuit for the coil of relay XH, this relay being maintained energized, however, through holding contacts XHI(I). Relay PR(I) also separates contacts PR4(I) and engages contacts PR3(I). This renders brush 98(I) effective instead of brush 109(I) so that, this brush being in engagement with stationary contact 94(I), the down hall lantern at the fourth floor is lighted. Also, relay PR(I) separates contacts PR2(I) and engages contacts PRI(I), rendering brush 48(I) effective instead of brush 58(I) so that if a down hall call had been registered for the fourth floor, the down fourth floor relay can be reset. Contacts XH2(I) complete a circuit for the neutralizing coil SM(I) of the stopping magnet, causing the car to be slowed down and brought to a stop at the fourth floor. The reengagement of contacts ASM3(I) incident to the stopping operation causes the down fourth floor relay if operated to be reset.

As the car comes to a stop, contacts H2(I) engage to complete a circuit through contacts XH4(I) for the operating coil DN(I) of the down direction switch and reset coil UP(I) of the up direction switch. This causes the operation of these switches to set the car for downward travel and the dropping out of relays XP(I) and XL(I) incident to this operation. The reengagement of contacts XL4(I) completes a circuit through contacts SR4(I) for the down starting lights DSLS(I) and DSLC(I) and gong DG(I), advising the starter and the car attendant that car No. 1 is to be started in the down direction, down timer light DTRL having been previously lighted by the engagement of contacts RR4 upon operation of the timing mechanism. The separation of contacts XLI(I) breaks the circuit for the coil of automatic return relay XH(I) which upon dropping out separates contacts XHI(I). This does not break the circuit for the coil of switch SR at this time, however, owing to the fact that the circuit for the coil of this switch is maintained through contacts DS4, HI(I) and SRI(I), contacts HI(I) reengaging in the stopping operation to complete the holding circuit for the coil of this switch.

Upon operation of the start control switch, the car is started in the down direction. Switch ASM(I) operates incident to the starting operation as previously described to break the circuit for the down hall lantern at the fourth floor. Also, switch H(I) upon operation separates contacts HI(I) to break the holding circuit for the coil of signal highest call return switch SR(I). This switch upon dropping out separates contacts SR4(I) to cause the discontinuance of the giving of the down starting signals DSLS(I) and DSLC(I) and gong DG(I).

Similar operation is had in the event that car No. 2 enters the selection zone under similar conditions of operation, that is, a down signal is given the car at a floor in the selection zone, provided the car has reached its highest call and that there is no car at the top floor and provided further that the timing mechanism has operated to close switch TM163 or, if it has not, upon the operation of the timing mechanism to close switch TM163 under such conditions.

It will be noted that the timed signal self-holding switches DD and UD upon being operated are maintained in operated condition so that if there is no car in condition to receive an up start signal or a down start signal at the time these switches are operated, such signal may be given immediately the car becomes eligible to receive it. Thus, in the example of operation given above with reference to giving the down start signal to a car in the selection zone, switch DD, if operated before the car has answered its highest call, is maintained operated so that as soon as this call is answered the down start signal may be given. Similarly, should no car be at the lower terminal at the time switch UD is operated, this switch is maintained operated so that upon the arrival of the car at the lower terminal it is immediately given the up start signal. The operation of switch UD under such conditions causes the lighting of time light UTRL to advise the starter that the timing mechanism has operated. Also, since none of the starting lights USLS are lighted, he is advised that no car is at the lower terminal floor to receive the starting signal. Similarly, the operation of switch DD under the above described conditions causes the lighting of timer light DTRL and as no starting light DSLS is lighted the starter is advised that no car is in condition to receive a down start signal.

It may happen that there is an abnormal delay in the arrival of a car at the lower terminal. In such event a car may not leave the lower terminal before timing motor operated switch TM165 closes. When switch TM165 closes, it completes a circuit for the coil of timing motor stop switch MS through contacts UD2 and UT5. Switch TM165 is set to close upon a certain amount of rotative movement after the closing of switches TM162 and TM163, the amount depending upon the characteristics of the particular installation. In certain installations switch TM165 has been set to close upon 170° rotative movement after the closing of switches TM162 and TM163. Switch MS upon operation separates contacts MS1 to break the circuit for the timing motor, bringing this motor to a stop. This is generally known as a detent operation.

When there is a detent operation due to a car not leaving the lower terminal within a certain time after the closing of switch TM162, the timing mechanism is restarted incident to the starting of the signalled car from this floor. As the start control switch is operated to start the car, contacts XT1 for that car engage to cause the reset of switch UD. Switch UD separates contacts UD2 to break the circuit for the coil of timing motor stop switch MS which reengages contacts MS1 to restart the timing motor in operation. Thus the timing motor switch operating shaft need complete only a partial revolution to effect the reclosing of switches TM162 and TM163 for the giving of the next starting signals so that, if cars are in position to receive these starting signals, the signals are given so as to keep the cars in balanced relationship after the readjustment due to the time lost while the timing mechanism was stopped.

Similarly, it may happen that a car at the upper terminal may not leave before timing motor operated switch TM165 closes. The closing of this switch completes a circuit for the coil of timing motor stop switch MS through contacts AB3, DD2 and DT7. Switch MS operates as above described to separate contacts MS1 to bring the timing motor to a stop. The timing mechanism is restarted in operation incident to the starting of the car on its downward trip. Contacts E1 for this car close incident to the starting of the car, completing a circuit for the reset coil of switch DD which, upon resetting, separates contacts DD2 to break the circuit for the coil of the timing motor stop switch which reengages contacts MS1 to restart the timing motor in operation.

If no car is at the top terminal at the time switch TM165 is closed, switch MS may be operated to stop the timing mechanism, subject to the conditions in the selection zone. If no car is in the selection zone at this time, as a car reaches the lowest floor in the zone its switch SR is operated and it is stopped at that floor provided it has no call for a floor in the zone or for the upper terminal. If the car entering the zone has a call in the zone, or if the car is already in the zone at the time switch TM165 closes and has not reached its highest call, and provided the car in either case has no call for the upper terminal, its switch SR is operated as the car answers its highest car or down hall call. Switch SR upon operation effects the reset of switch DD to deenergize switch MS and thus restart the timing mechanism in operation. Under such conditions of operation the timing motor is restarted before the down start signal is given. It is to be noted that relay RR, which is deenergized under such conditions due to the reset of switch DD, cannot be reoperated until the car starts its downward trip. This is due to the provision of contacts SR2 of each elevator in the circuit for the coil of relay RR by-passing holding contacts RR2. Thus, should switch DD be reoperated by the reclosing of switch TM163, the circuit for its reset coil cannot be established again through contacts SR3 of this car, thus assuring the giving of the new down starting signals to the next available car.

It is to be noted that with this arrangement the timing motor is detented whenever a car at the lower terminal has not left in response to its starting signals before switch TM165 closes and also when no car is available to receive its down starting signals at the time switch TM165 closes or, if a car is at the upper terminal and has received its down starting signals, in the event that it does not leave before switch TM165 closes. Once a detent has been effected it cannot be released if the car which received the up start signal has not left the lower terminal, until it leaves, or if the down start signal has been given a car at the upper terminal and such car has not left, until it leaves, or if no car was available to receive the down starting signals at the time switch TM165 closed, until a car becomes available and receives its signal provided this occurs as the car reaches a floor in the selection zone below the upper terminal.

It is thus seen from the above description that when the cars are operating under "up and down" traffic conditions a car, upon arrival at the lower terminal floor and becoming set for travel in the up direction under conditions where no other car is at that floor, is selected to be the next to leave. Its loading light is lighted to advise the attendant that it has been selected and the up hall lantern for that car is lighted to advise intending passengers that this car has been selected as the next to leave. Upon operation of the timing mechanism the up start signals are given. Upon the car being started in the up direction, the signals are discontinued so that another car may be selected upon its reaching the lower terminal and its starting signal given upon the next operation of the timing mechanism. The timing mechanism operates to give the starting signals at timed intervals so that in this way the cars are started from the lower terminal with regularity.

Similar operation is had as regards starting the cars from the upper terminal. If a car arrives at the upper terminal under conditions where no other car is at that terminal, it is selected to be the next to leave, the down hall lantern at that floor lighting to advise any intending passengers who may be at that floor of this fact. Upon operation of the timing mechanism, a down start signal is given the car. Upon the car being started in the down direction, the signals are discontinued so that another car may be selected upon its reaching the upper terminal and its starting signal given upon the next operation of the timing mechanism.

Due to traffic conditions or other causes, cars may be delayed in their upward trip so that no car is at the upper terminal when the time for the giving of the down starting signal has arrived. Under such conditions, an up travelling car if in a certain selection zone or upon its arrival in that zone, and provided it has reached its highest call, is brought to a stop, becomes set for travel in the down direction and receives the down starting signal so that it is started in the down direction from the floor at which the stop was made. When a car enters this zone, if no car call is registered for a floor above the car or at the point where the last car call has been answered, highest call return selection relay RS is operated, which causes operation of the selecting mechanism to select that car. This operation takes place regardless of whether or not the time has arrived for the starting signal to be given provided no other car has previously been selected. If the time has arrived or upon its arrival, down signal highest call return relay RR operates so that if no hall call exists for a floor above the car or if the car has reached its highest down hall call, highest hall call relay XS is operated, which in turn causes operation of automatic return relay XH to cause the car to be slowed down and brought to a stop. Also, signal highest call return switch SR is operated to cause the reset of the down timed signal self-holding switch and the giving of the down starting signals for the car. As the car comes to a stop its direction of travel becomes set for down and as it starts in the down direction the down signals are discontinued.

If two cars are in the selection zone and are eligible to receive the down starting signal, the rotary switch for the down selecting circuit acts to select but one of the cars. Thus only the car selected will establish the circuit for its automatic return relay XH. As soon as this circuit is established, relay RS is dropped out to allow another car to be selected. However, down signal highest call return relay RR has been reset and its circuit cannot be reestablished until the timing mechanism operates again to close switch TM163. Thus no other up travelling car which has answered its highest call can be set for travel in the down direction until the timing mechanism operates.

When a car gets considerably behind its schedule, the timing mechanism is detented. The detent may occur as a result of a car being late in leaving the lower terminal or the upper terminal and also as a result of a car not being available to receive the down starting signal. Once there is a detent operation, this is not released until the car which received the up starting signal is started from the lower terminal and, if a down start signal has been given a car at the upper terminal, until such car leaves, or if no car was available to receive the down start signal at the time of the detent, until a car becomes available in the selection zone or leaves the upper terminal.

Once relay RR has been dropped out it cannot be reoperated until the car has been slowed down, stopped and actually started in the down direction. This prevents two down starting signals from being cancelled by one car. This might occur under conditions where the timing mechanism was detented due to no car being at the upper terminal or in the selection zone in condition to receive a down start signal when switch TM165 operated. When a car receives its down starting signal under such conditions at a floor in the selection zone, the detent is released, restarting the timing mechanism in operation. Thus it may be that the car will not have slowed down, stopped and restarted in the down direction before the timing device operates to reestablish the circuit for relay DD. However, under such conditions the signal highest call return switch SR for the car which is to start in the down direction prevents, by the separation of its contacts SR2, the operation of relay RR, thereby preventing the reset of relay DD and thus the new down start signal by this car.

A car arriving at the top terminal has preference as to the receipt of the down starting signal. That is, if a car arrives at the upper terminal before automatic return relay XH for another car has had a chance to go in and become self-holding, the car at the upper terminal will be the one which is given the down start signal. It is immaterial whether another car below the top terminal has been selected or not for if it has the circuit for its highest hall call return selection relay RS is broken as the aforementioned car arrives at the upper terminal and effects the separation of contacts PD1 of its top terminal relay. This causes contacts RS3 of said other car to reengage, permitting the notching of the down rotary switch in position to re-select the car which arrived at the upper terminal.

Assume now a period in which the traffic is predominantly up with almost no down traffic, as during the morning incoming peak. To change from dispatching under up and down traffic conditions to dispatching under predominantly up traffic conditions, up traffic button UTB is pressed. This breaks the holding circuit for down traffic switch DT. Switch DT drops out, separating contacts DT6 to render the timing mechanism ineffective to control the giving of the down starting signals, separating contacts DT8 to prevent the energization of relay RR, separating contacts DT3 to prevent the energization of relays RS, engaging contacts DT2 to prepare another circuit for the coils of relays XS, engaging contacts DT1 to complete a circuit for the coil of top terminal non-selection relay UH, and engaging contacts DT9 to cause the down timer light DTRL at the starter's station to be permanently lighted. The permanent lighting of the down timer light is to advise the starter that the up travelling cars are to be given the down starting signals immediately they are in condition to receive them. Relay UH upon operation engages contacts UH1(1) to by-pass down selective relay contacts DL(1) in the circuit for the coil of automatic return relay XH(1). A contact is provided on the switch for each of the elevators and arranged in this circuit relationship. Up traffic switch UT is maintained in operated condition so that the up traffic button may be released.

Under such conditions of operation, the dispatching of the cars from the lower terminal in response to up starting signals given by the timing mechanism is the same as previously described. That is, the car upon its arrival at the lower terminal under conditions where no other car is already at that floor is selected upon its being set for upward travel to be the next to leave. Its loading light and up hall lantern are lighted immediately and upon operation of the timing mechanism to close switch TM163 the starting signals are given. Incident to the starting of the car in the up direction, discontinuance of the giving of the signals is effected and the system is put in condition to select a car already at the floor or upon the arrival of another car at the floor.

When a car button is pressed in a car for a floor above that car, the coil of highest car call relay XC for that car is energized, preventing the energization of highest hall call relay XS for that car. Similarly, if a hall call is registered for a floor above the car, the back contacts of the operated floor relay are separated, also preventing the energization of the highest hall call relay XS for that car. However, upon the car reaching a floor for which a car button in that car is pressed or for which a down hall call is registered under conditions where the up hall call for that floor is not registered and no car button in that car for a floor above is operated and no hall call for a floor above is registered, relay XS for that car is operated to cause the operation of relay XH for that car, causing the car to be automatically slowed down and brought to a stop at that floor and its direction of travel set for down. Also, switch SR for that car is operated, which causes the down starting signals to be given for the car as it is brought to a stop.

In order that this may be more clearly understood, assume that car No. 1 is started upwardly from the first floor under predominantly up traffic conditions with the third floor car button CB3(1) pressed and a down hall call registered for the third floor, causing contacts 3D2 to be separated. Car button CB3(1) causes the energization of relay XC(1), which separates contacts XC1(1). This prevents the energization of the coil of relay XS1 regardless of whether any of the floor relay back contacts were separated or not. As the car arrives at any certain distance from the third floor, cam 88(1) engages and opens hook switch 83(1) and with no car buttons pressed for floors above, this breaks the circuit for the coil of relay XC(1). This relay drops out to engage contacts XC1(1). Immediately after the opening of hook switch 83(1) by cam 88(1), brush 78(1) engages stationary contact 73(1) and, if no up hall call is registered for the third floor and no hall call is registered for any floor above, completes a circuit through contacts DT2 and floor relay back contacts 6D2, 5U1, 5D2, 4U1, 4D2 and 3U1, throwover switch blade TO6, contacts 73(1), brush 78(1), and contacts XP2(1) and XC(1) for the coil of relay XS(1). Relay XS(1) engages contacts XS1(1) to complete a circuit through contacts UH1(1), ASM1(1), EA1(1) and XL1(1) for the coil of relay XH(1). Relay XH(1) operates as previously described to cause the down third floor relay to be reset and the car to be slowed down, brought to a stop at the third floor, and its direction of travel changed to down. Relay XH(1) also causes the operation of switch SR(1), which operates to engage contacts SR4(1) so that upon reengagement of contacts XL4(1) as the car comes to a stop and effects the change in setting of the direction of car travel a circuit is completed for the down starting signals DSLS(1), DSLC(1) and DG(1). This advises the car attendant that he has reached his highest call and also gives him the signal to start. As soon as the car is started in the down direction contacts H1(1) separate to cause the dropping out of switch SR(1) to discontinue the giving of the starting signals.

Should a hall call have been registered for a floor above the third floor, relay XS(1) would not have been operated upon the engagement of brush 78(1) with stationary contacts 73(1), and the car would remain set for travel in the up direction as previously described. Also, should an up hall call be registered for the third floor, and no calls registered for floors above, relay XS(1) would not have been operated upon the engagement of brush 78(1) with stationary contact 73(1) until after the operation of switch ASM(1) to effect the reset of the up floor relay. At the same time relay ASM(1) would operate as previously described to prevent the operation of relay XH(1) so that the direction of car travel would not be changed upon the stop being made. Thus the passenger who pressed the up third floor hall button upon entering the car would be taken in the up direction.

Should the top terminal floor car button in the car or the hall button at that floor have been operated, the car would travel to the top floor, where its direction of travel would be changed as it is brought to a stop. Inasmuch as contacts 76(1) are not connected in the circuit for the coil of relay XS(1), the down starting signals are given to the car through the operation of the selecting mechanism as previously described, the circuit for these signals being through contacts XL4(1), DL4(1) and DT8. Should two cars be travelling upwardly under conditions where only one hall call is registered above them, upon the leading car picking up this call the following car, if it has no car button pressed for a floor above it, completes the circuit for its highest hall call relay XS upon the engagement of its brush 78 with its next stationary contact, thereby completing the circuit for the coil of its automatic return relay XH, causing the car to be slowed down and brought to a stop at the floor for which the stationary contact is provided, whereupon it is set for travel in the down direction and the down starting signals given.

With such operation, each of the cars set for travel in the up direction upon being brought to a stop at a floor under conditions where no car button in that car for a floor above is operated, where no up hall call for that floor is registered and where no hall call for a floor above is registered, becomes set for travel in the down direction and its down starting signals are given immediately so that the car may return immediately to the lower terminal. In this way the cars are started from the lower terminal to take incoming passengers to their various destinations and as soon as the passengers have been distributed and no hall calls remain to be responded to for floors above, the cars are immediately returned to the lower terminal so as to enable them to keep on schedule.

Assume now a period in which the traffic is predominantly down, with almost no up traffic, as during the evening outgoing peak. Under such conditions the cars may be operated on "zone return," which will be explained later, or started in the down direction upon receipt of starting signals given at regular intervals. To change from dispatching under predominently up traffic conditions to dispatching under predominantly down traffic conditions, down traffic button DTB is closed. This breaks the holding circuit for up traffic switch UT which, upon dropping out, engages contacts UT1 to complete a circuit through button DTB for the coil of up permanent light relay PL. Switch UT also separates contacts UT4 to render the timing mechanism ineffective to control the giving of up starting signals and also engages contacts UT6 to cause the up timer light at the starter's station to be permanently lighted. The permanent timer light is to advise the starter that down travelling cars are to be given their up starting signals immediately they arrive at the lower terminal and become set for travel in the up direction.

Under such conditions of operation, the dispatching of the cars in response to down starting signals given by the timing mechanism is the same as previously described under up and down traffic conditions. That is, if a car arrives at the upper terminal floor before the timing mechanism operates to close switch TM165, the down starting signal is given the car at the upper terminal. If switch TM165 is closed before a car reaches the upper terminal, the down starting signal is given a car in the selection zone upon its reaching its highest call. When a car arrives at the lower terminal and becomes set for travel in the up direction, it is immediately selected to leave, even though there be another car at that floor also selected but not yet started. Also, the up starting signal is given the car immediately regardless of whether the timing mechanism is operated or not. Taking for example car No. 1, as it arrives at the lower terminal and becomes set for travel in the up direction its bottom terminal relay PU(1) is operated. The resultant engagement of contacts PU3(1) completes a circuit for the coil of up selective relay UL(1) through contacts PL1(1) of the up permanent light relay. It is to be noted that this is independent of the position of the brushes of the up rotary switch and thus independent of whether another car is at the lower terminal. The up selective relay engages contacts UL3(1) and thus a circuit is completed immediately for the starting signals for car No. 1 through contacts UT6. Thus this car may start immediately in the up direction. The loading light and up hall lantern at the lower terminal for that car are also lighted so that any intending passenger who may be at that floor may get on the car.

It may be desirable under certain conditions to start a car away from a terminal without waiting for the timed signal. The starter may do this by pushing the start signal button for that terminal. Assume that the dispatching mechanism is set for up and down traffic conditions, i. e., that both up traffic switch UT and down traffic switch DT are closed. To give a manual start signal to a car at the lower terminal, the starter presses up start signal button USB. This completes a circuit for the operating coil of up manual signal self-holding switch UM, this switch being latched in operated condition and being provided with a reset coil. Switch UM upon operation engages contacts UM1 and UM2. Contacts UM2 complete a circuit for the start signals for the selected car at the lower terminal. Assume that car No. 1 is the car which has been selected. Upon operation of its start control switch to start the car, the engagement of the XT1(1) contacts completes a circuit through contacts UMH2 and UM1 for the reset coil of switch UM, causing this switch to be reset.

Should the timing mechanism operate to give the start signals before the start control switch of car No. 1 is operated to start the car, the operation of switch UD prevents the reset of switch UM when the start control switch is operated. Swith UD effects this operation by its contacts UD1, which complete a circuit for the operating coil of up manual signal holding relay UMH, this relay having a holding coil. Relay UMH in turn engages contacts UMH1 and UMH3 and separates contacts UMH2. Contacts UMH2 are in the circuit for the reset coil of switch UM, while contacts UMH3 prepare a circuit for the holding coil of relay UMH. Thus, upon the operation of the start control switch of car No. 1 to start the car, the engagement of contacts XT1(1) completes the circuit for the holding coil of relay UMH so that this relay remains operated upon the reset of switch UD. Thus contacts UMH2 remain separated, preventing the reset of switch UM. The circuit for the holding coil of relay UMH is broken upon the dropping out of the up selective relay UL(1) as car No. 1 leaves the lower terminal. Thus, should a car already be at the lower terminal at the time the first car left, its starting signals are given immediately, or if not, as soon as it arrives at the lower terminal, due to the fact that switch UM remains operated. Upon operation of the start control switch for the latter car to start the car, the circuit for the reset coil of switch UM is completed by the engagement of the XT1 contacts for that car, causing switch UM to be reset.

To give a manual down start signal to a car, the starter presses down start signal button DSB. This completes a circuit for the operating coil of down manual signal self-holding switch DM, this switch being latched in operated condition and being provided with a reset coil. Switch DM upon operation engages contacts DM1 and DM2. Contacts DM1 complete a circuit for relay RR which operates to engage contacts RR1 and RR4. Assume that car No. 1 is at the upper terminal at this time and that the regular time signal has not been given. Under such conditions the engagement of contacts RR4 completes a circuit through contacts DL4(1) to cause the giving of the down start signals for car No. 1. Upon the starting of the car in the down direction, contacts E1(1) close, completing a circuit for the reset coil of switch DM, causing this switch to be reset.

Should the timing mechanism operate to give the start signals before contacts E1(1) close, the operation of switch DD prevents the reset of switch DM. Switch DD effects this operation by its contacts DD1 which complete a circuit for the operating coil of down manual signal holding relay DMH. Relay DMH in turn engages contacts DMH3 and separates contacts DMH1 and DMH2. Contacts DMH2 are in the circuit for the reset coil of switch DM, while contacts DMH3 prepare a circuit for the holding coil of relay DMH. Thus upon the starting of the car the engagement of contacts E1(1) completes a circuit for the holding coil of relay DMH to maintain this relay in operated condition upon the reset of switch DD. Thus contacts DMH2 remain separated, preventing the reset of switch DM. The circuit for the holding coil of relay DMH is broken upon the dropping out of down selective relay DL(1) as car No. 1 leaves the upper terminal. Thus switch DM remains operated to give down starting signals to another car as soon as such car becomes available. Assuming that this signal is given to another car at the upper terminal, as soon as this car is started in the down direction a circuit is completed through contacts DM2 for the reset coil of switch DM upon the engagement of contacts E1 for that car, causing switch DM to be reset.

Should no car be at the upper terminal at the time button DSB is pressed, as soon as there is a car in the selection zone which has reached its highest call or as soon as a car enters this zone with no call above to be responded to, the circuit for relay RS for that car, say car No. 1, is completed through contacts RR1. This causes the operation of relay XH(I) to cause the car to be slowed down and brought to a stop at the floor for which the highest call is registered or at the fourth floor if there were no call above. Also, relay XH(I) causes the operation of switch SR(I), which completes a circuit through contacts SR3(I), RR3, DMH2 and DM2 for the reset coil of switch DM, causing this switch to be reset. The circuit for the down starting signals for car No. 1 is completed through contacts SR4(I) as the car comes to a stop, as previously described.

Should the down timed signal be given before switch DM is reset, contacts DMH2 prevent the reset of switch DM upon the engagement of contacts SR3(I). Thus upon the separation of contacts RR3, switch DM remains in operated condition so as to cause the giving of the down starting signals to the next available car upon the starting of car No. 1 on its downward trip. In this connection it is to be noted that contacts DMH1 are in the circuit including contacts DM1, by-passing contacts DD3. Thus, upon the reset of switch DD to separate contacts DD3, contacts DMH1 remain separated to permit the dropping out of relay RR. Contacts DMH1 reengage as a result of the separation of contacts RR3 to break the circuit for the holding coil of relay DMH. However, the reengagement of contacts DMH1 does not reestablish the circuit for the coil of relay RR owing to the fact that contacts SR2(I) remain separated until car No. 1 starts its downward travel. This insures that the reset of switch DM will be by the next car receiving the manual starting signal and starting down. Without contacts DMH1, relay RR would remain operated upon the reset of switch DD. If no other car became available before car No. 1 was started down, relay DMH would drop out upon separation of contacts SR3(I) and reengage contacts DMH2. But switch DM would not be reset because contacts SR3(I) and DL3(I) would be separated [the latter contacts being separated because contacts RS4(I) drop out upon operation of relay XH (I)]. However, if another car should arrive at the upper terminal before car No. 1 was started down, it would receive its starting signals through contacts RR4 and as contacts DMH2 would be separated because contacts SR3(I) had not dropped out, this other car might leave the upper terminal without completing its reset circuit for switch DM through contacts E1, XL3 and DL3 for that car because of the separation of contacts DMH2. With contacts DMH1 provided to effect the dropping out of relay RR upon the reset of switch DD, however, this other car does not receive its starting signals until after car No. 1 has started down and, contacts DMH2 being in engagement as a result of the separation of contacts RR3, the reset of switch DM is assured upon the starting of this other car in the down direction.

Contacts UMH1 engaged as a result of the closing of timing motor switch TM162 complete a circuit for the coil of up signal lock out relay UMR. This relay engages contacts UMR2 to establish a self-holding circuit and separates contacts UMR1 to break the circuit for the operating coil of switch UD. Thus should the attendant in the car which receives the up starting signals as a result of the operation of switch UD operate his start control switch to start his car and thus effect the reset of switch UD before timing motor operated switch TM162 opens, contacts UMR1 prevent the immediate reoperation of switch UD to cause the giving of up starting signals to another car. Relay UMR remains operated and thus contacts UMR1 remain separated until timing motor operated switch TM162 opens. Thus the reoperation of switch UD is prevented until the timing mechanism has completed another cycle of operation.

Up to this point the description of the operation of the dispatching system has been on the assumption that an even number of cars were in operation. When there are an odd number of cars in operation, as for example when a car is taken out of service, the time of giving the starting signals when the cars are being dispatched for both upward and downward travel is modified. With an odd number of cars in operation, under such assumption, signal relation switch SRS is closed, completing a circuit for the coil of signal relation relay AB. Relay AB upon operation engages contacts AB2 and AB4 and separates contacts AB1 and AB3. The separation of contacts AB1 and the engagement of contacts AB2 render down time signal self-holding switch DD subject to timing mechanism operated switch TM164 instead of switch TM163. Thus the giving of the down starting signals becomes subject to switch TM164. The giving of the up starting signals, however, remains subject to contacts TM162 as before. Switch TM164 may be set to close upon 180° of rotative movement after the closing of switch TM162.

The separation of contacts AB3 and the engagement of contacts AB4 render the detenting of the timing mechanism, in case no car is available to receive a down starting signal upon the expiration of a certain timing interval after the engagement of switch TM164 subject to switch TM166 instead of switch TM165. The detenting of the up starting signal is subject to switch TM165 as before. Switch TM166 may be set to close 180° after the closing of switch TM165, or in other words 170° after the closing of switch TM164. It is to be noted that with contacts AB3 separated the coil of switch MS is deenergized in case of a detent operation in the giving of the up starting signals as soon as contacts UD2 open even though contacts DD2 are closed, and in case of a detent operation in the giving of the down starting signals as soon as contacts DD2 open even though contacts UD2 are closed. During operation with an even number of cars the coil of switch MS is not deenergized after a detent operation until both contacts UD2 and contacts DD2 are separated.

Signal relation switch SRS may be closed with an even number of cars in operation where it is desired to have a predominant number of cars in either the up or the down direction. In such event manual button USB is utilized to get more cars on the up trip and button DSB is utilized to get more cars on the down trip.

For night service the dispatching mechanism is cut out. This is effected by opening switch DNK, which deenergizes day service switch DS. Switch DS upon dropping out separates contacts DS1, DS2 and DS4 and engages contacts DS3 and DS5. The separation of contacts DS1 and DS2 disconnects the driving motor and the supply motor for the dispatching circuits from the supply mains, shutting down the dispatching system. The engagement of contacts DS3 connects in the buzzer circuits. Switch MSB for the car or cars selected for night service is closed to render the buzzer BUZ in the car effective. Thus when a hall button is pressed the coil of call bell relay CA is energized and this relay upon operation engages contacts CA1, completing a circuit for the buzzer BUZ in the night service car. Contacts DS5 permit the completion of the circuit for the highest call return light HCRL of a night service car standing at the lower terminal upon registration of a call above. It is to be noted that when the night service car, say car No. 1, is standing at the lower terminal under these conditions the coil of highest hall call relay (XS(1)) is energized so that contacts XS2(1) are separated. Upon the registration of a hall call, however, the back contacts of the operated floor relay separate, deenergizing the coil of relay XS(1), permitting the engagement of contacts XS2(1) to complete the circuit for light HCRL(1). Contacts DS4 prevent the establishment of a holding circuit for the coil of switch SR for the night service car. Thus, if the attendant in the car desires to go to a floor above the highest call after the direction has been set for down and presses up reversal button URB in the car, the engagement of contacts XL1(1) as the up direction circuits are established does not cause the energization of the coil of relay XH(1) through the holding circuit for the coil of switch SR(1). Thus the direction circuits are not changed back to down as the reversal button is released.

To provide "zone return" operation under conditions where the traffic is predominantly in the down direction, in addition to closing down traffic button DTB, manual zone return control switch ZRS is closed. Thus, in addition to switch DT and relay PL, zone return switch TS is operated. Switch TS upon operation engages contacts TS1 and TS4 and separates contacts TS2 and TS3. Contacts TS1 complete a circuit through limit switch 1TOL1 for throw-over switch motor TOM1. Although in certain instances one throw-over switch motor may be utilized to operate the throw-over switches, the circuits for two of them, TOM1 and TOM2, are illustrated inasmuch as with a large number of cars and a large number of floors with more zones, a large number of throw-over switch blades are provided. Under such conditions, part of these blades are operated by one motor and the remainder by the other motor. Throw-over switch motor TOM1 upon operation moves the switch blades operated thereby from the positions illustrated to their other positions, and as they reach these positions limit switch 1TOL1 opens and limit switch 1TOL2 closes, contacts TS2 in circuit with limit switch 1TOL2 being open. Also, limit switch 1TOL3 closes and limit switch 1TOL4 opens. The closing of limit switch 1TOL3 completes a circuit through limit switch 2TOL1 and throw-over switch motor TOM2. This motor operates in a similar manner to throw the switch blades controlled thereby from the positions illustrated to their other positions and as they reach these positions limit switch 2TOL1 opens and limit switch 2TOL2 closes.

Throw-over switch blade TO1 causes the operation of upper terminal non-selection relay UH, which engages a plurality of contacts UH1, one for each elevator, to by-pass contacts DL1 in the circuit for the coil of relay XH for that elevator. Throw-over switch blade TO2 cuts out the selection zone utilized in giving down starting signals to the cars under the conditions of operation previously described, in connection with dispatching with timed signals. Throw-over switch blade TO3 breaks the circuit for the timing motor, cutting the timing mechanism out of operation. Incident to this change, contacts TS3 of the zone return switch render relays AB, DMH, UMH, UMR and RR and switches UM, DM, UD, DD and MS, utilized in timed dispatching, ineffective for zone return operation.

The number of zones which may be provided depends upon the requirements of the particular installation. There may be several in case of high buildings. For simplicity, the circuits are shown for only two zones, termed the lower zone and the upper zone. Also, the circuits are shown for the lower zone cars with service switches provided for rendering the lower zone cars effective to help out cars in the upper zone. In this way, upper zone car operation can be conveniently described by utilizing the circuits which adapt lower zone cars to upper zone operation, although it is to be understood that in the preferred arrangement in actual practice the uppermost zone cars will not be provided with the service switches whereby changes may be made from this zone to the zone below. Throw-over switch blades TO4, TO5 and TO6 have to do with operation of the cars in the upper zone and will be referred to later. A throw-over switch blade TO8 is provided for each car and each of these switches for the lower zone cars acts, upon being thrown over for zone return operation, to break the circuit for the lower terminal hall lantern and loading light for that car. A throw-over switch blade TO9 is provided for each of the lower zone cars and each of these blades acts in conjunction with contacts XP3 for that car to deenergize the non-stop switch for that car when set for upward travel. Thus the lower zone cars are unable to make stops in response to up hall calls. As the lower zone cars do not respond to up hall calls and as the upper zone cars always run to the upper zone, the back contacts of the up hall button floor relays for the floors in the lower zone are rendered ineffective to control relays XS, contacts 2U1 by throw-over switch blade TO7 and contacts 3U1 by throw-over switch blade TO6.

Thus on zone return operation relay XC of each lower zone car is deenergized for upward travel of the car provided no car button in that car is pressed for the second, third or fourth floors. Assuming car No. 1 to be a lower zone car and to be at the lower terminal with its relay XC(1) deenergized, contacts XC1(1) are in engagement. In addition, if no down hall call is registered by the down third floor relay, the circuit for the coil of relay XS(1) is completed through contacts DT3, throw-over switch blade TO2, throw-over switch blade TO6, floor relay contacts 3D2, throw-over switch blade TO7, selector contact 72(1), brush 78(1), coil XS(1), contacts XP2(1) and contacts XC1(1), regardless of whether a down second floor call is registered or not. If a down hall call is registered for the third floor, the corresponding floor relay contacts have separated, preventing the operation of relay XS(1). Assuming that down third floor relay contacts 3D2 are separated, relay XS(1) is not operated until brush 78(1) engages contact 73(1). Inasmuch as floor relay contacts above throw-over switch blade TO6 are disconnected from those below TO6, these floor relays cannot affect the operation of relay XS(1). When relay XS(1) is operated, contacts XS1(1) engage, causing the operation of relay XH(1) to bring the car to a stop at the next floor as previously described. Also, the circuits are set for downward travel so that upon the operation of the start control switch the car is started in the down direction. With this arrangement, each lower zone car runs from the lower terminal to the highest unanswered down call in the lower zone, where it is brought to a stop and set for travel in the down direction.

Although the hall lanterns at the lower terminal for the lower zone cars are not lighted so as not to attract people to these cars to be taken in the up direction, should any one enter one of these cars at the lower terminal, the car buttons for the floors in the lower zone are effective to cause the car to travel to the corresponding floors, causing relay XC to be energized until the car reaches the highest of these floors and to stop at these floors through the energization of the neutralizing coil of stop magnet SM. However, the car buttons in the lower zone cars for the upper zone are ineffective because switch U21 is open.

When a lower zone car arrives at the lower terminal set for travel in the up direction, its starting signals are given immediately, the circuit being through contacts UT6 and contacts UL3 of its selective relay, the coil of this relay being energized through contacts of relay PL as previously described. Also, as each lower zone car reaches its highest call in its upward travel, its switch SR operates in response to the operation of its relay XH, causing the giving of the down starting signals for that car as it is brought to a stop and its relay XL drops out as previously described, the circuit for these signals extending through contacts TS4.

To describe the operation of the upper zone cars during "zone return," switches UZ1, UZ2 and UZ3 for each car are closed and switch UZ4 for each car is thrown from the position illustrated to its other operative position. Referring to car No. 1, for example, switch UZ1(1) in conjunction with throw-over switch blade TO4(1) for car No. 1 renders the car buttons in the car for the upper zone, that is, the car buttons for the fourth, fifth and sixth floors in the circuits illustrated, effective to control the operation of the car, and since the car buttons for the floor in the lower zone are directly connected to the feed line, all the car buttons in an upper zone car are effective to control the car. Switch UZ2(1) causes the first floor hall lantern HL1U(1) to be permanently lighted. This attracts intending passengers at the lower terminal to this upper zone car. Switch UZ4(1) renders the loading light for car No. 1 subject to the up selective relay UL(1), thus causing this light to become lighted as soon as the car arrives at the lower terminal. Switch UZ3(1) prevents non-stop of the car except in response to the operation of non-stop button NSB(1). Therefore this car responds to up hall calls on its upward travel. Throw-over switch blade TO5(1) for car No. 1 maintains the highest car call relay XC(1) energized during upward travel of the car until cam 88(1) opens switch 84(1), thereby insuring that the car will travel at least to the fourth floor. Thus relay XS(1) cannot be energized until brush 78(1) engages its contacts 74(1).

With this arrangement each upper zone car runs from the lower terminal to the highest unanswered down call in the upper zone where it is brought to a stop and set for travel in the down direction, provided there is no car call or up hall call for a floor above. In the event that its highest call is a car call, it will run to this floor before it is set for travel in the down direction upon being brought to a stop. Should its highest call be an up call, it runs to this floor from which it takes the entering passenger to his floor where, if it be the highest car call, the car is set for downward travel when it is brought to a stop. During its upward trip it stops to discharge passengers in response to car buttons and also to pick up any up hall calls. As each upper zone car reaches its highest call in its upward travel, if the stop is made at a floor below the upper terminal its switch SR operates to cause the giving of the down starting signals for that car as it is brought to a stop as in the case of the lower zone cars. If the highest call is at the upper terminal, the start signals are given by relays XL and DL. On its downward trip the car responds to down hall calls in its zone and also in the lower zone provided it is not filled to capacity, requiring the operation of the non-stop button. As it arrives at the lower terminal it is set for travel in the up direction and its starting signals are given immediately, the circuit extending through contacts UT6. Thus the cars are started immediately on their upward trips for more passengers.

It is preferred in actual practice to have the upper zone car circuits and lower zone car circuits different. In the preferred arrangement, each top zone car would not be provided with switch UZ1 or throw-over switch blade TO4, the car buttons for the upper zone and throw-over switch blade TO5 on the zone return side being connected directly to the feed line as in the case of car buttons of the lower zone. Also, none of the cars would be provided with switch UZ2. In the case of each upper zone car, the throw-over switch blade TO8 on the zone return side is connected directly to the feed line. This connection for each of the lower zone cars is omitted. Also, switch UZ4 would not be provided for any of the cars, the loading light for each of the lower zone cars being connected directly in parallel with the first floor hall lantern for that car and the loading light for each of the upper zone cars being connected to the throw-over switch blade TO8 for that car on the dispatching side. Also, switch UZ3 would not be provided for either lower zone or upper zone cars, the by-pass controlled by this switch being omitted in the case of each lower zone car and being made permanent in the case of each upper zone car. Thus with this arrangement any lower zone car when changed over by the closure of its switch UZ1 to assist the upper zone cars would not stop on its upward trip in response to up hall calls as in the case of the permanent upper zone cars, nor would its first floor hall lantern or loading light be lighted. It would, however, run to the upper zone before it could make a stop incident to which its direction of travel becomes set for down. During its downward travel it would stop in response to down hall calls the same as the permanent upper zone cars.

By way of review of the operation of the dispatching system, the cars under conditions where traffic is in both the up and down directions are started on their upward and downward trips upon the receipt of starting signals, given at regular intervals. When a car arrives at the lower terminal under conditions where no other cars are there, its hall lantern is lighted and a loading light is lighted in the car. Upon expiration of the time period, the starting signal is given and the attendant starts his car in the up direction. This causes the loading light and hall lantern to be extinguished and the giving of the starting signal to be discontinued. If another car has already arrived at the lower terminal, its hall lantern and loading light are not lighted until the first car leaves. Upon the expiration of another time period the starting signal is given to this other car and the attendant starts the car in the up direction. This operation is repeated for each of the cars as it arrives at the lower terminal.

Assume that the cars reach the upper terminal before the expirations of the respective time periods. As a car arrives at the upper terminal its hall lantern is lighted and upon the expiration of the time period the down starting signal is given and the attendant starts the car in the down direction. As a result the hall lantern is extinguished and the giving of the starting signal is discontinued. This operation is repeated as each car arrives at the upper terminal.

Should the time period expire before a car arrives at the upper terminal, the starting signal is given a car in a certain zone below the upper terminal provided the car has reached its highest call. If at the expiration of this time period no car has reached this selection zone, upon a car reaching this zone it is slowed down and brought to a stop at the lowermost floor of the zone provided there is no call for any floor in the zone or for the upper terminal or that the only call is a car call for that car for such floor or down hall call for such floor. Also, the down hall lantern at that floor is lighted for that car and as the car comes to a stop it becomes set for travel in the down direction and the down starting signal is immediately given. If a car is in the selection zone at the expiration of the time period and there is no call above the car, it is similarly slowed down and stopped at the next floor, its down hall lantern lighted, and as the car comes to a stop it becomes set for travel in the down direction and the down starting signal is immediately given. Also, if there be a car call or a down hall call for a floor in the selection zone, the car is brought to a stop in response to the highest one of these and similarly becomes set for downward travel and the down starting signal is immediately given. In each of these cases upon operation of the start control by the attendant, the car is started in the down direction and as a result the hall lantern is extinguished and the giving of the down starting signal is discontinued.

Should the time period expire before a car arrives at the lower terminal, the starting signal is given a car immediately upon its arrival at the lower terminal. Should there be an abnormal delay in the arrival of a car at the lower terminal or if for some other reason the car which has received the signal does not leave the lower terminal until the expiration of a certain period after the expiration of the regular timing period, a detent operation takes place. As soon as the car leaves the terminal, however, the detent is released. Should no car be available to receive the down start signal upon the expiration of a predetermined period after the expiration of the regular timing interval, or should a car be at the upper terminal and not leave until the expiration of such period after the regular time interval, again a detent operation takes place. This detent is released as soon as a car becomes available in the selection zone to receive the down start signals, or if at the upper terminal as soon as the car leaves.

When conditions are such that traffic is predominantly up with almost no down traffic, as during the incoming peak in the morning, the cars are started on their upward trips upon receipt of starting signals given at regular intervals. When the car responds to its highest car call or the highest down hall call, it becomes set for down travel as it is brought to a stop and the starting signal is immediately given. Detenting at the lower terminal is the same as during up and down traffic conditions.

When conditions are such that traffic is predominantly down with almost no up traffic, as during the evening outgoing peak, the cars are started on their downward trips upon the receipt of starting signals given at regular intervals. If a car arrives at the upper terminal before the expiration of the time period, the starting signal is given at the upper terminal. If the time period expires before a car arrives at the upper terminal, the starting signal is given a car at a floor in the selection zone provided it does not have a call for the upper terminal, the same as under conditions where there is traffic in both the up and the down directions. At the lower terminal each car is given its starting signal immediately upon arrival at this floor without regard to the time period or the presence of other cars. Detenting in the case of the down start signals is the same as under up and down traffic conditions.

The starting signals may be given manually when desired. The manual up starting signals are given to cars at the lower terminal. The manual down starting signals may be given to cars either at the upper terminal or in the selection zone. If there be no car at the upper terminal at the time the manual switch is operated to give a down starting signal, as soon as a car in the selection zone reaches its highest call it is set for travel in the down direction and the starting signal given as it is brought to a stop, or if a car has no call above at this time it is brought to a stop at the first floor in the selection zone at which a stop can be made and is set for travel in the down direction and the starting signal given as it is brought to a stop. In the case of the starting of the cars from the lower terminal on manual signal, to insure that this is effected in the event that the regular time interval expires before a car leaves this terminal, the manual starting signal is retained to be given to the next car. Similarly, in the case of the starting of the cars on their downward trips on manual signal, to insure that a car receives the manual start signal, the signal is retained in the event the regular time interval expires before a car at the upper terminal which received the signal starts its downward trip, or before a car reaches a floor below the upper terminal at which it would receive the manual signal, to be given to the next available car.

While the invention has been described as applied to a six-floor installation, it is to be understood that it is applicable to any number of floors, six being chosen merely as a matter of convenience. Also, various numbers of floors may be included in the selection zone, the arrangement depending upon the requirements of the particular installation. Similarly, while the dispatching circuits in part have been shown for only two cars, it is to be understood that the circuits in these instances may be extended in a similar manner to other cars. This is likewise true of control circuits which have been shown for only one car. Also, a relatively simple control system has been illustrated and it is to be understood that it may be considerably amplified.

In addition, it is contemplated that many of the features of the invention disclosed may be used in connection with apparatus and circuits different from those specifically described and also in connection with other forms of elevator control. Many apparently widely different embodiments of the invention can be made without departure from the spirit or scope of the invention. It is therefore intended that all matter contained in the above description or shown in the accompanying drawings shall be interpreted as illustrative and not in a limiting sense.

What is claimed is:

1. In a dispatching system for a plurality of elevator cars in which the cars are dispatched from an upper terminal upon receipt of starting signals given in response to operations of mechanism occurring at regular intervals of time, means responsive to an operation of said mechanism at a time when no car is available at the upper terminal to receive a signal for causing the signal to be given a car below such terminal.

2. In a dispatching and control system for a plurality of elevator cars in which the cars are stopped at floors in response to calls registered by car buttons in the respective cars and by hall buttons common to the cars and in which the cars are dispatched from the upper terminal upon receipt of starting signals given in response to operations of mechanism occurring at regular intervals of time, means responsive to an operation of said mechanism at a time when no car is available at the upper terminal to receive a signal for causing the signal to be given a car as it reaches in its upward travel a floor below such terminal, provided such car has reached its highest call.

3. In a dispatching and control system for a plurality of elevator cars in which the cars are stopped at floors in response to calls registered by car buttons in the respective cars and by hall buttons common to the cars and in which the cars are dispatched from the upper terminal upon receipt of starting signals given in response to operations of mechanism occurring at regular intervals of time, means operable upon operation of said mechanism at a time when no car is available at the upper terminal to receive a signal to cause the signal to be given a car as it reaches in its upward travel a floor below such terminal upon making a stop at such floor in response to a car call, provided such car has reached its highest call, and means for automatically setting such car for downward travel as it is brought to a stop at such floor.

4. In a dispatching and control system for a plurality of elevator cars in which a plurality of car buttons, one for each of a plurality of intermediate floors and one for the upper terminal, are provided in each car for registering calls for that car, in which an up hall button and a down hall button at each of said intermediate floors and a hall button at said upper terminal are provided for registering calls common to the cars, in which the cars during upward travel are stopped at said intermediate floors for which calls are registered by their respective car buttons and by hall buttons in response to such calls, and in which the cars are dispatched from the upper terminal upon receipt of starting signals given in response to operations of mechanism occurring at regular intervals of time, means operable upon operation of said mechanism at a time when no car is available at the upper terminal to receive a signal to cause a car to make a stop at any one of a plurality of said intermediate floors below such terminal for which a call is registered by the down hall button at such floor, provided such car has no up hall call for such floor and no call for any floor above, and for causing the signal to be given such car, and means for automatically setting such car for downward travel incident to the stopping of such car at such floor.

5. In a dispatching and control system for a plurality of elevator cars in which a plurality of car buttons, one for each of a plurality of intermediate floors and one for the upper terminal, are provided in each car for registering calls for that car, in which an up hall button and a down hall button at each of said intermediate floors and a hall button at said upper terminal are provided for registering calls common to the cars, in which the cars during upward travel are stopped at said intermediate floors for which calls are registered by their respective car buttons and by up hall buttons in response to such calls and during downward travel at said intermediate floors for which calls are registered by their respective car buttons and by down hall buttons in response to such calls, in which mechanism is provided for each car for automatically controlling direction of car travel, and in which the cars are dispatched from the upper terminal upon receipt of starting signals given in response to operations of mechanism occurring at regular intervals of time, means responsive to an operation of said signal mechanism at a time when no car is available at the upper terminal to receive a signal for causing, upon a car in its upward travel reaching any one of a plurality of said intermediate floors below such terminal for which it has a car call or down hall call, provided such car has no up hall call for such floor and no call for any floor above, the signal to be given such car as the car is brought to a stop and for causing such stop in the event such call is a down hall call, and means for causing operation of said direction controlling means for such car to set the car for downward travel as it is brought to such stop.

6. In a dispatching and control system for a plurality of elevator cars in which a plurality of car buttons, one for each of a plurality of intermediate floors and one for the upper terminal, are provided in each car for registering calls for that car, in which an up hall button and a down hall button at each of said intermediate floors and a hall button at said upper terminal are provided for registering calls common to the cars, in which the cars during upward travel are stopped at said intermediate floors for which calls are registered by their respective car buttons and by up hall buttons in response to such calls and during downward travel at said intermediate floors for which calls are registered by their respective car buttons and by down hall buttons in response to such calls, in which mechanism is provided for each car for automatically controlling direction of car travel, and in which the cars are dispatched from the upper terminal upon receipt of starting signals given in response to operations of mechanism occurring at regular intervals of time, means for controlling operation of said direction controlling mechanism to cause each car to continue its upward travel to the upper terminal regardless of whether or not a call is registered for such terminal provided it reaches the terminal before operation of said signal mechanism to give a signal, and means responsive to an operation of said signal mechanism at a time when no car is available at the upper terminal to receive a signal for causing a car upon reaching a down hall call for any one of a plurality of said intermediate floors below such terminal to be brought to a stop at such floor provided an up hall call is not registered for such floor and no call affecting such car is registered for any floor above, and for causing operation of said direction controlling mechanism for a car which is brought to a stop at any one of such specified floors for which a down hall call is registered or for which a car call for that car is registered under conditions where the car upon reaching such call has no up hall call for such floor and no call affecting it for any floor above to set the car for downward travel, and for causing the starting signal to be given to such car.

7. In a dispatching and control system for a plurality of elevator cars in which a plurality of car buttons, one for each of a plurality of intermediate floors and one for the upper terminal, are provided in each car for registering calls for that car, in which an up hall button and a down hall button at each of said intermediate floors and a hall button at said upper terminal are provided for registering calls common to the cars, in which the cars during upward travel are stopped at said intermediate floors for which calls are registered by their respective car buttons and by up hall buttons in response to such calls and during downward travel at said intermediate floors for which calls are registered by their respective car buttons and by down hall buttons in response to such calls, in which mechanism is provided for each car for automatically controlling direction of car travel, and in which the cars are dispatched from the upper terminal upon receipt of starting signals given in response to operations of mechanism occurring at regular intervals of time, means for controlling operation of said direction controlling mechanism to cause each car to continue its upward travel to the upper terminal regardless of whether or not a call is registered for such terminal provided it reaches the terminal before operation of said signal mechanism to give a signal, and means responsive to an operation of said signal mechanism at a time when no car is available at the upper terminal to receive a signal for selecting a car in a zone comprising a plurality of said intermediate floors immediately below such terminal upon the car reaching the highest down hall call or its highest car call in such zone, provided it has no call for a floor above or up hall call for the floor corresponding to such highest call, or upon the car reaching the next floor in the zone at which a stop can be made in the event it has no call above, to receive the signal and for effecting the stopping of the car in the event the selected car is one that has reached its highest down call at the floor for which the call is registered and at said next floor in the event it has no call above and for causing operation of said direction controlling mechanism for such selected car to set the car for downward travel upon its being brought to a stop and for causing the starting signal to be given to such selected car as it is brought to a stop.

8. In a dispatching and control system for a plurality of elevator cars in which a plurality of car buttons, one for each of a plurality of intermediate floors and the upper terminal, are provided in each car for registering calls for that car, in which an up hall button and a down hall button at each of said intermediate floors and a hall button at said upper terminal are provided for registering calls common to the cars, in which each car is provided with stopping mechanism operable during upward travel of the car to stop the car at said intermediate floors for which calls are registered by its car buttons and by up hall buttons in response to such calls, in which mechanism is provided for each car for controlling direction of car travel, and in which the cars are dispatched from the upper terminal upon receipt of starting signals given in response to operations of mechanism occurring at regular intervals of time, means for selecting as available to receive a starting signal a car which has arrived at the upper terminal or in the event no car has reached the upper terminal at the time said signal mechanism operates one which is in a zone comprising a plurality of said intermediate floors immediately below such terminal and has reached its highest call, provided such call is not an up hall call for a floor in such zone, said stopping mechanism for each car acting upon that car being rendered available in said zone to bring the car to a stop at the next floor, and means for causing said signal to be given to a car which has been rendered available and the operation of said direction controlling mechanism for such car to set the car for downward travel upon its being brought to a stop.

9. In a dispatching system for a plurality of elevator cars in which the cars are dispatched from an upper terminal upon receipt of starting signals given in response to operations of mechanism occurring at regular intervals of time, means response to an operation of said mechanism at a time when no car is available at the upper terminal to receive a signal for causing the signal to be given a car in a zone comprising a plurality of intermediate floors below such terminal, and means for detenting said mechanism at the expiration of a predetermined time interval after an operation thereof in the event that at the time of such operation and by the expiration of such interval no car has reached the upper terminal and there is no car in said zone.

10. In a dispatching and control system for a plurality of elevator cars in which a plurality of car buttons, one for each of a plurality of intermediate floors and the upper terminal, are provided in each car for registering calls for that car, in which an up hall button and a down hall button at each of said intermediate floors and a hall button at said upper terminal are provided for registering calls common to the cars, in which each car during its upward travel is stopped at said intermediate floors for which calls are registered by its car buttons and by up hall buttons in response to such calls, and in which the cars are dispatched from the upper terminal upon receipt of starting signals given in response to operations of mechanism occurring at regular intervals of time, means for detenting said signal mechanism at the expiration of a predetermined time interval after an operation thereof in the event that at the time of such operation and during such interval, no car has reached the upper terminal and there is no car in a zone comprising a plurality of said intermediate floors immediately below such terminal which has reached its highest call, and means for preventing operation of said detenting means under conditions where a car, prior to the expiration of said predetermined time interval, reaches said zone with no call in the zone or at the upper terminal to be responded to.

11. In a dispatching and control system for a plurality of elevator cars in which a plurality of car buttons, one for each of a plurality of intermediate floors and the upper terminal, are provided in each car for registering calls for that car, in which an up hall button and a down hall button at each of said intermediate floors and a hall button at said upper terminal are provided for registering calls common to the cars, in which each car during its upward travel is stopped at said intermediate floors for which calls are registered by its car buttons and by up hall buttons in response to such calls, and in which the cars are dispatched from the upper terminal upon receipt of starting signals given in response to operations of mechanism occurring at regular intervals of time, means for selecting as available to receive a starting signal a car which has arrived at the upper terminal or in the event no car has reached the upper terminal at the time said signal mechanism operates one which is in a zone comprising a plurality of said intermediate floors immediately below such terminal and has reached its highest call, provided such call is not an up hall call for a floor in such zone, means for causing said signal to be given to a car which has been rendered available, and means for detenting said signal mechanism in the event that no car has been rendered available to receive a signal by the expiration of a predetermined time interval after an operation of said signal mechanism.

12. In a dispatching and control system for a plurality of elevator cars in which a plurality of car buttons, one for each of a plurality of intermediate floors and the upper terminal, are provided in each car for registering calls for that car, in which an up hall button and a down hall button at each of said intermediate floors and a hall button at said upper terminal are provided for registering calls common to the cars, in which each car is provided with stopping mechanism operable during upward travel of the car to stop the car at said intermediate floors for which calls are registered by its car buttons and by up hall buttons in response to such calls, in which mechanism is provided for each car for controlling direction of car travel, and in which the cars are dispatched from the upper terminal upon receipt of starting signals given in response to operations of mechanism occurring at regular intervals of time, means for selecting as available to receive a starting signal a car which has arrived at the upper terminal or in the event no car has reached the upper terminal at the time said signal mechanism operates one which is in a zone comprising a plurality of said intermediate floors immediately below such terminal and has reached its highest call, provided such call is not an up hall call for a floor in such zone, said stopping mechanism for each car acting upon that car being rendered available in said zone to bring the car to a stop at the next floor, means for causing said signal to be given to a car which has been rendered available and the operation of said direction controlling mechanism for such car to set the car for downward travel upon its being brought to a stop, and means for detenting said signal mechanism in the event that no car is available to receive said signal at the expiration of a predetermined time interval after the operation of said signal mechanism to give said signal.

13. In a dispatching and control system for a plurality of elevator cars in which a plurality of car buttons, one for each of a plurality of intermediate floors and one for the upper terminal, are provided in each car for registering calls for that car, in which an up hall button and a down hall button at each of said intermediate floors and a hall button at said upper terminal are provided for registering calls common to said cars, in which the cars during upward travel are stopped at said intermediate floors for which calls are registered by their respective car buttons and by up hall buttons in response to such calls, in which mechanism is provided for each car for automatically controlling direction of car travel, and in which the cars are dispatched from the upper terminal upon receipt of starting signals given in response to operations of mechanism occurring at regular intervals of time, means responsive to an operation of said signal mechanism at a time when no car is at the upper terminal to receive a signal for rendering available to receive the signal a car in a zone comprising a plurality of said intermediate floors immediately below such terminal upon the car reaching the highest down hall call or its highest car call in such zone, provided it has no call for any floor above or up hall call for the floor corresponding to such highest call, and for effecting the stopping of the car in the event the car rendered available is one that has reached its highest down call at the floor for which the call is registered and for causing the starting signal to be given the car rendered available and the operation of said direction controlling mechanism for such rendered available car to set the car for downward travel upon its being brought to a stop, and means for detenting said signal mechanism in the event that no car is at the upper terminal at the time of said operation of said signal mechanism to give said signal and no car is available to receive said signal at the expiration of a predetermined time interval after the operation of said signal mechanism to give said signal until a car becomes available or reaches the upper terminal and starts its downward trip.

14. In a dispatching and control system for a plurality of elevator cars in which a plurality of car buttons, one for each of a plurality of intermediate floors and one for the upper terminal, are provided in each car for registering calls for that car, in which an up hall button and a down hall button at each of said intermediate floors and a hall button at said upper terminal are provided for registering calls common to the cars, in which the cars during upward travel are stopped at said intermediate floors for which calls are registered by their respective car buttons and by up hall buttons in response to such calls, in which mechanism is provided for each car for automatically controlling direction of car travel, and in which the cars are dispatched from the upper terminal upon receipt of starting signals given in response to operations of mechanism occurring at regular intervals of time, and means responsive to an operation of said signal mechanism at a time when no car is at the upper terminal to receive a signal for selecting a car in a zone comprising a plurality of said intermediate floors immediately below the terminal upon the car reaching the highest down hall call or its highest car call in such zone, provided it has no call for any floor above or up hall call for the floor corresponding to such highest call, or upon the car reaching the next floor in the zone at which a stop can be made in the event it has no call above, to receive such signal and for effecting the stopping of the car in the event the selected car is one that has reached its highest down call at the floor for which the call is registered and at said next floor in the event it has no call above and for causing operation of said direction controlling mechanism for such selected car to set the car for downward travel upon its being brought to a stop and for causing the starting signal to be given to such selected car as it is brought to a stop, and means for detenting said signal mechanism in the event that no car is at the upper terminal at the time of said operation of said signal mechanism to give said signal and a car does not reach a floor in said selection zone at which it can receive said signal within a predetermined time interval after the operation of said signal mechanism to give said signal until a car does reach such floor or reaches the upper terminal and starts its downward trip.

15. In a dispatching system for a plurality of elevator cars in which the cars are dispatched on their upward and downward trips upon receipt of starting signals and in which the starting signals for starting the cars on their downward trips are give in response to operations of mechanism occurring at regular intervals of time, means for causing a signal for starting a car on its upward trip to be given immediately upon arrival of that car at the lower terminal, regardless of whether other cars are at the lower terminal at that time or not.

16. In a dispatching system for a plurality of elevator cars in which the cars are dispatched on their upward trips and their downward trips upon receipt of starting signals, in which the starting signals for starting the cars on their downward trips are given in response to operation of mechanism occurring at regular intervals of time, and in which means are provided for each car for controlling the direction of car travel, means for causing a signal for starting a car on its upward trip to be given immediately upon the car being brought to a stop at the lower terminal and operation of said direction controlling means for that car to set it for travel in the up direction, regardless of whether other cars set for travel in the up direction are at the lower terminal at that time or not.

17. In a dispatching and control system for a plurality of elevator cars in which a plurality of car buttons, one for each of a plurality of intermediate floors and the upper terminal, are provided in each car for registering calls for that car, in which an up hall button and a down hall button at each intermediate floor and a hall button at the upper terminal are provided for registering calls common to the cars, in which each car during its upward travel is stopped at intermediate floors for which calls are registered by its car buttons and by up hall buttons in response to such calls, and in which the cars are dispatched from the upper terminal upon receipt of starting signals given in response to operations of mechanism occurring at regular intervals of time, manually operable means for causing a car which in its upward trip has reached the highest down hall call or its highest car call at a floor in a zone comprising a plurality of intermediate floors immediately below said upper terminal, under conditions where an up hall call is not registered for the floor for which such highest down hall call is registered and no call is registered for any floor above, to be given a signal to start its downward trip upon its being brought to a stop at such floor and for causing such stop in the event the call be a down hall call.

18. In a dispatching and control system for a plurality of elevator cars in which a plurality of car buttons, one for each of a plurality of intermediate floors and the upper terminal, are provided in each car for registering calls for that car, in which an up hall button and a down hall button at each intermediate floor and a hall button at the upper terminal are provided for registering calls common to the cars, in which each car during its upward travel is stopped at intermediate floors for which calls are registered by its car buttons and by up hall buttons in response to such calls, and in which the cars are dispatched from the upper terminal upon receipt of starting signals given in response to operations of mechanism occurring at regular intervals of time, manually operable means for causing a car which in its upward trip has reached the highest down hall call or its highest car call at a floor in a zone comprising a plurality of intermediate floors immediately below said upper terminal, under conditions where an up hall call is not registered for the floor for which such highest down hall call is registered and no call is registered for any floor above, to be given a signal to start its downward trip upon its being brought to a stop at such floor and for causing such stop in the event the call be a down hall call, or in the event that a car in said zone has no call above for causing such car to be brought to a stop at the next floor at which a stop can be made and such signal to be given to that car.

19. In a dispatching and control system for a plurality of elevator cars in which a plurality of car buttons, one for each of a plurality of intermediate floors and the upper terminal, are provided in each car for registering calls for that car, in which an up hall button and a down hall button at each intermediate floor and a hall button at the upper terminal are provided for registering calls common to the cars, in which each car during its upward travel is stopped at intermediate floors for which calls are registered by its car buttons and by up hall buttons in response to such calls, in which mechanism is provided for each car for automatically controlling the direction of car travel, and in which the cars are dispatched from the upper terminal upon receipt of starting signals given in response to operations of mechanism occurring at regular intervals of time, manually operable means for causing a car which in its upward trip has reached the highest down hall call or its highest car call at a floor in a zone comprising a plurality of intermediate floors immediately below said upper terminal, under conditions where an up hall call is not registered for the floor for which such highest down hall call is registered and no call is registered for any floor above, to be given a signal to start its downward trip upon its being brought to a stop at such floor and for causing such stop in the event the call be a down hall call, and for causing operation of said direction controlling mechanism for such car to set it for downward travel upon its being brought to a stop.

20. In a dispatching and control system for a plurality of elevator cars in which a plurality of car buttons, one for each of a plurality of intermediate floors and the upper terminal, are provided in each car for registering calls for that car, in which an up hall button and a down hall button at each intermediate floor and a hall button at the upper terminal are provided for registering calls common to the cars, in which each car during its upward travel is stopped at intermediate floors for which calls are registered by its car buttons and by up hall buttons in response to such calls, in which mechanism is provided for each car for automatically controlling the direction of car travel, in which means is provided for each car for causing the starting of the car, and in which the cars are dispatched on their downward trips upon receipt of starting signals given in response to operations of mechanism occurring at regular intervals of time, manual means adapted upon operation during the period between two successive operations of said signal mechanism to cause a car, which in its upward trip reaches during such period its highest call at or above a certain floor, to be given a signal to start its downward trip upon its being brought to a stop at the floor for which such call is registered and for causing such stop in the event such call be a down hall call, and for causing operation of said direction controlling mechanism for such car to set it for downward travel upon its being brought to a stop, and means for causing, in the event that another operation of said signal mechanism occurs before such car has reached such highest call, the timed signal to be given such car and the manual signal to be retained for another car.

21. In a dispatching and control system for a plurality of elevator cars in which a plurality of car buttons, one for each of a plurality of intermediate floors and the upper terminal, are provided in each car for registering calls for that car, in which an up hall button and a down hall button at each intermediate floor and a hall button at the upper terminal are provided for registering calls common to the cars, in which each car during its upward travel is stopped at intermediate floors for which calls are registered by its car buttons and by up hall buttons in response to such calls, in which mechanism is provided for each car for automatically controlling the direction of car travel, in which means is provided for each car for causing the starting of the car, and in which the cars are dispatched on their downward trips upon receipt of starting signals given in response to operations of mechanism occurring at regular intervals of time, manual means adapted upon operation during the period between two successive operations of said signal mechanism to cause a car, which in its upward trip reaches during such period the highest down hall call at a floor in a zone comprising a certain intermediate floor and the floors above, under conditions where an up hall call is not registered for the floor for which such highest down hall call is registered and no call is registered for any floor above, or a car in said zone which has no call above, to be brought to a stop at the floor for which such down call is registered or at the next floor in the zone at which a stop can be made in the event it has no call above, for causing such car upon being brought to such a stop or a car whose highest call is a car call in said zone upon being brought to a stop at the floor for which such car call is registered to be given a signal to start its downward trip and to be set for travel in the down direction by its direction controlling mechanism, and means for causing, in the event that another operation of said signal mechanism occurs before a car has reached such highest down hall call or car call or has reached said zone in the event it has no call in the zone, the timed signal to be given such car and the manual signal to be retained for another car.

22. In a dispatching system for a plurality of elevator cars in which the cars are dispatched from a terminal upon receipt of starting signals given in response to operations of mechanism occurring at regular intervals of time and in which means are provided for each car for causing the starting of the car, manually operable means for causing said signal to be given immediately to a car at said terminal, and means for causing such signal to be retained for another car in the event that the time arrives for said signal mechanism to give a signal before operation of the starting means for the car which was given the manual signal to start the car from said terminal.

23. In a dispatching system for a plurality of elevator cars in which the cars are dispatched from a terminal upon receipt of starting signals given in response to operations of mechanism occurring at regular intervals of time and in which manual start control means are provided in each car for causing the starting of the car, manually operable means for causing a starting signal to be given to a car at said terminal before operation of said signal mechanism to give the signal, means for each car responsive to the operation of said start control means for such car for cancelling the manually given signal, and means for causing such manually given signal to be given to another car at said terminal without reoperation of said manually operable means in the event that the time arrives for said signal mechanism to give a signal before operation of said signal cancelling means for the car which was given the manual signal.

GAVIN WATSON.